United States Patent
Nakamura

(10) Patent No.: US 8,530,083 B2
(45) Date of Patent: Sep. 10, 2013

(54) ELECTRODE STORAGE DEVICE

(75) Inventor: Yoshiyuki Nakamura, Nishikamo-gun (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 13/446,907

(22) Filed: Apr. 13, 2012

(65) Prior Publication Data

US 2012/0196180 A1  Aug. 2, 2012

Related U.S. Application Data

(62) Division of application No. 12/438,469, filed as application No. PCT/IB2007/002398 on Aug. 22, 2007, now Pat. No. 8,323,829.

(30) Foreign Application Priority Data

Aug. 25, 2006 (JP) .................................. 2006-229359
Feb. 20, 2007 (JP) .................................. 2007-038881

(51) Int. Cl.
*H01M 4/02* (2006.01)
*H01G 9/00* (2006.01)

(52) U.S. Cl.
USPC .......................... 429/209; 429/210; 429/231.8

(58) Field of Classification Search
USPC ....................... 429/209, 210, 231.8
See application file for complete search history.

(56) References Cited

U.S. PATENT DOCUMENTS

| | | | |
|---|---|---|---|
| 3,337,336 A | 8/1967 | Rao | |
| 3,728,158 A | 4/1973 | Poe et al. | |
| 3,790,409 A * | 2/1974 | Fletcher et al. | 429/163 |
| 3,972,727 A | 8/1976 | Cohn | |
| 4,154,908 A | 5/1979 | Menard | |
| 5,344,727 A | 9/1994 | Meadows et al. | |
| 6,458,489 B1 | 10/2002 | Alzieu et al. | |
| 7,695,865 B2 * | 4/2010 | Saito et al. | 429/212 |

(Continued)

FOREIGN PATENT DOCUMENTS

| | | |
|---|---|---|
| EP | 2 045 866 A1 | 4/2009 |
| GB | 1 214 285 A | 12/1970 |

(Continued)

OTHER PUBLICATIONS

Office Action issued in parent U.S. Appl. No. 12/438,469 on Apr. 25, 2012.

(Continued)

*Primary Examiner* — Joseph S Del Sole
*Assistant Examiner* — Nahida Sultana
(74) *Attorney, Agent, or Firm* — Kenyon & Kenyon LLP

(57) ABSTRACT

An electrode is used for an electric storage device that includes plural electrodes that are stacked such that an ion-conductive layer is disposed between each pair of the electrodes. Each of the plural electrodes includes a current collector, and an electrode layer, formed on the current collector, which contains an active material. The configuration of the electrode layer (for example, the amount of the active material) varies according to the position in the electrode layer such that a current density in a first region of the electrode, where heat radiation performance is lower than the heat radiation performance in a second region of the electrode, is lower than the current density in the second region of the electrode.

11 Claims, 14 Drawing Sheets

(56) References Cited

U.S. PATENT DOCUMENTS

| | | | |
|---|---|---|---|
| 8,124,278 B2* | 2/2012 | Muraoka et al. | 429/217 |
| 8,323,829 B2* | 12/2012 | Nakamura | 429/209 |
| 2001/0018147 A1* | 8/2001 | Yanai et al. | 429/62 |
| 2004/0086781 A1 | 5/2004 | Fukuzawa et al. | |
| 2005/0147885 A1* | 7/2005 | Sato et al. | 429/217 |
| 2006/0147795 A1* | 7/2006 | Li et al. | 429/209 |
| 2009/0075161 A1* | 3/2009 | Ando et al. | 429/94 |
| 2009/0186270 A1* | 7/2009 | Harada et al. | 429/185 |
| 2010/0136393 A1* | 6/2010 | Takezawa et al. | 429/94 |
| 2010/0273035 A1* | 10/2010 | Kim | 429/82 |
| 2011/0274969 A1* | 11/2011 | Wang | 429/210 |
| 2012/0021285 A1* | 1/2012 | Kogetsu et al. | 429/218.1 |
| 2012/0115028 A1* | 5/2012 | Ueno et al. | 429/209 |
| 2012/0223681 A1* | 9/2012 | Stone et al. | 320/137 |
| 2013/0029203 A1* | 1/2013 | Ross et al. | 429/149 |

FOREIGN PATENT DOCUMENTS

| | | |
|---|---|---|
| JP | 10 149820 A | 6/1998 |
| JP | 2000-090980 A | 3/2000 |
| JP | 2000-195556 A | 7/2000 |
| JP | 2001-015146 A | 1/2001 |
| JP | 2005-011660 A | 1/2005 |
| JP | 2005-174691 A | 6/2005 |
| JP | 2005-209411 A | 8/2005 |
| JP | 2006-012703 A | 1/2006 |
| WO | 2006/119289 A1 | 11/2006 |

OTHER PUBLICATIONS

Notice of Allowance & Allowability issued in parent U.S. Appl. No. 12/438,469 on Aug. 2, 2012.

* cited by examiner

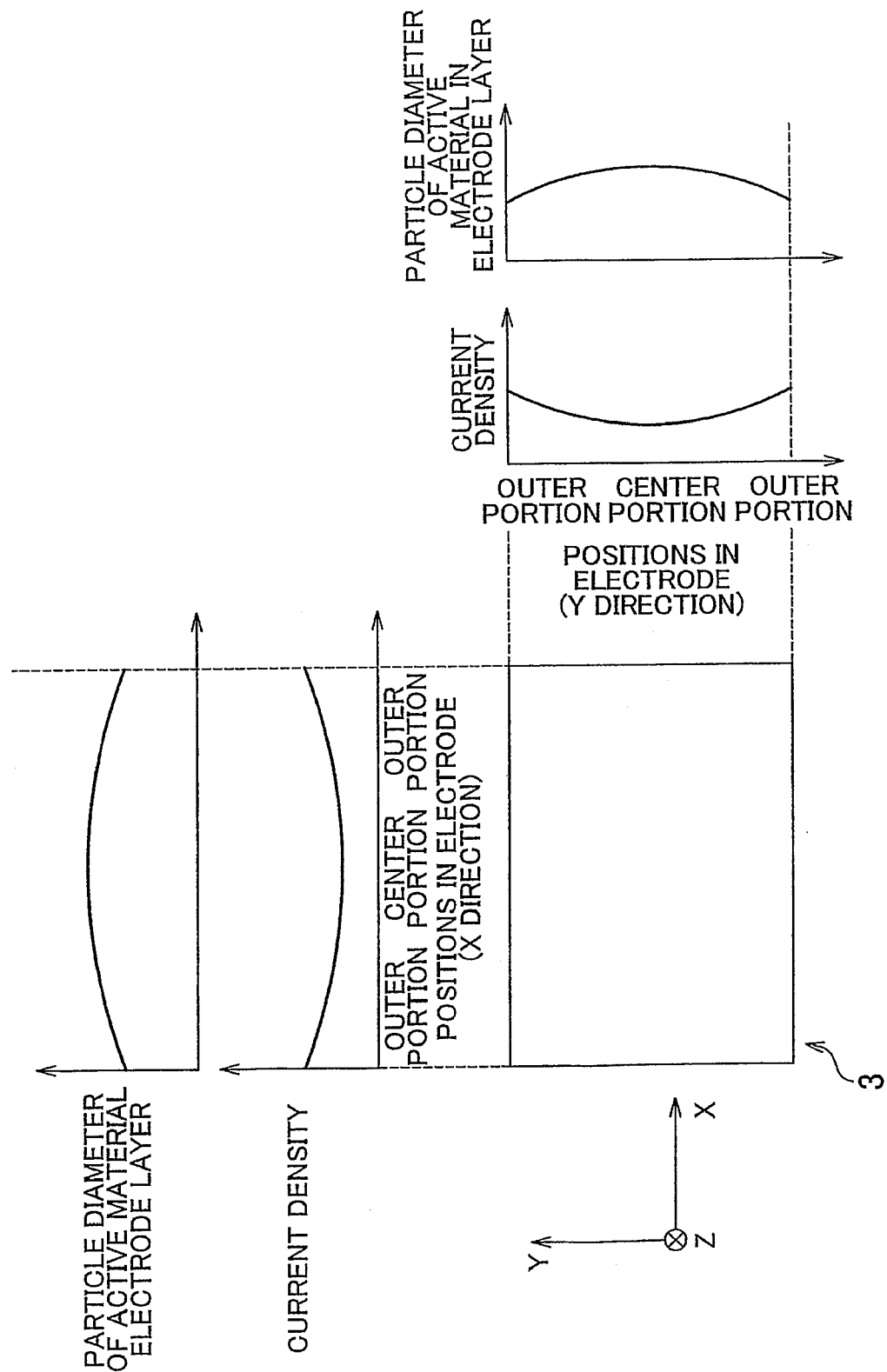

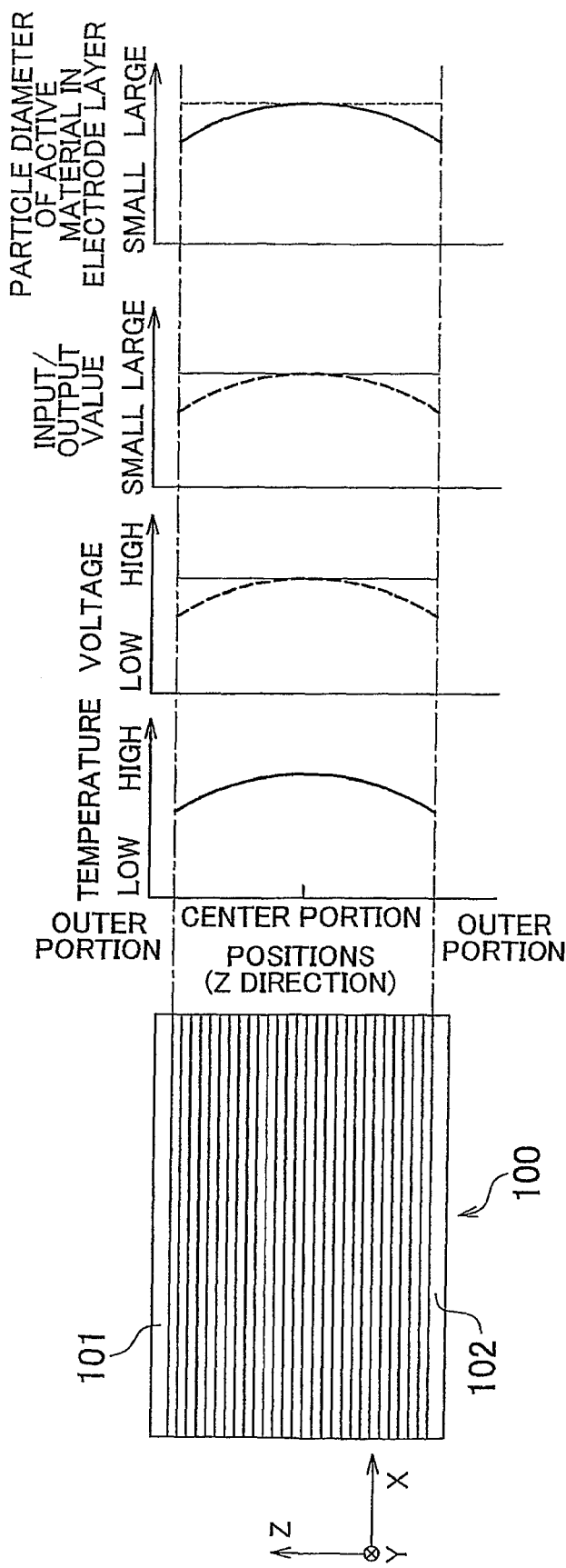

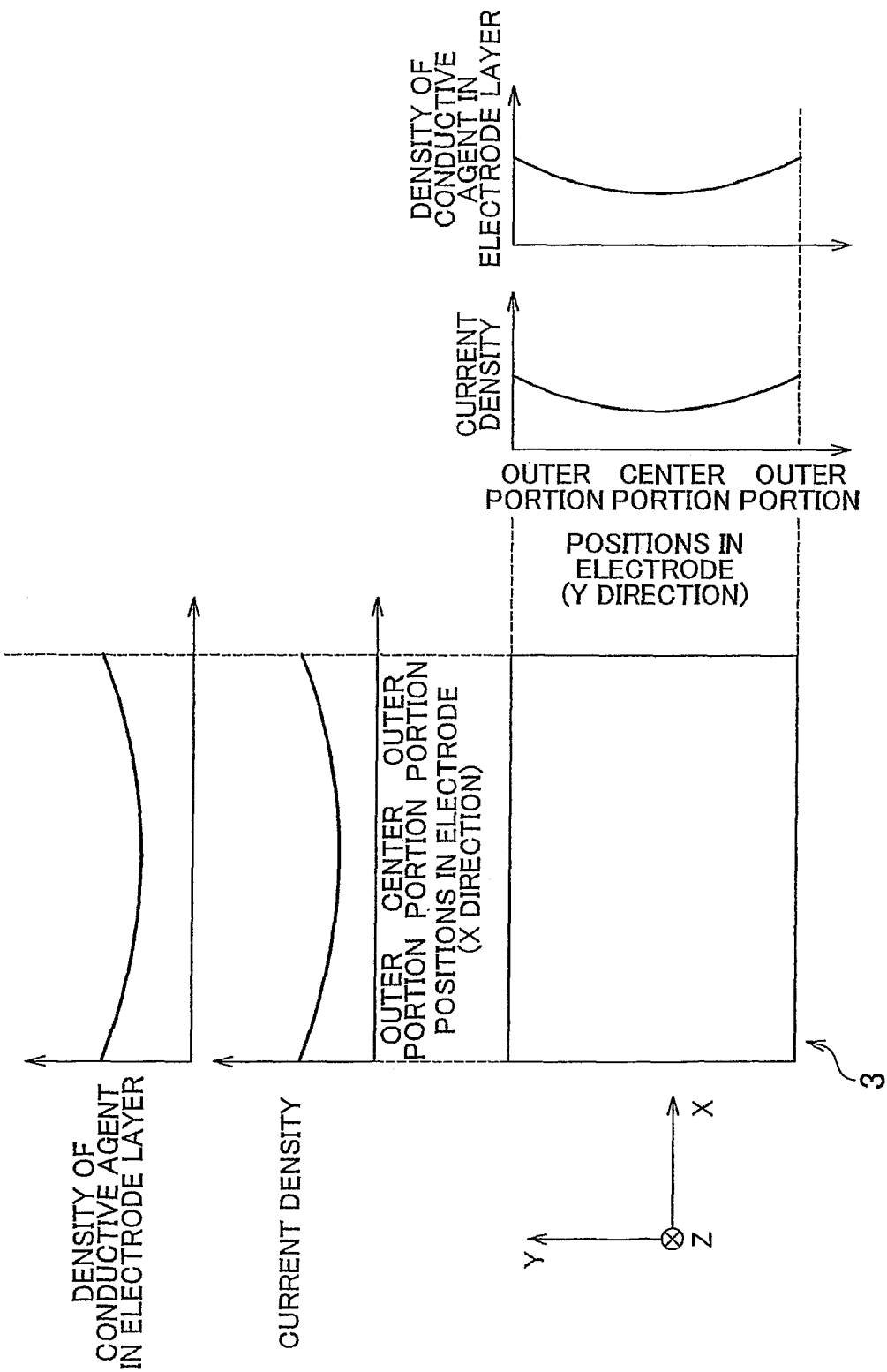

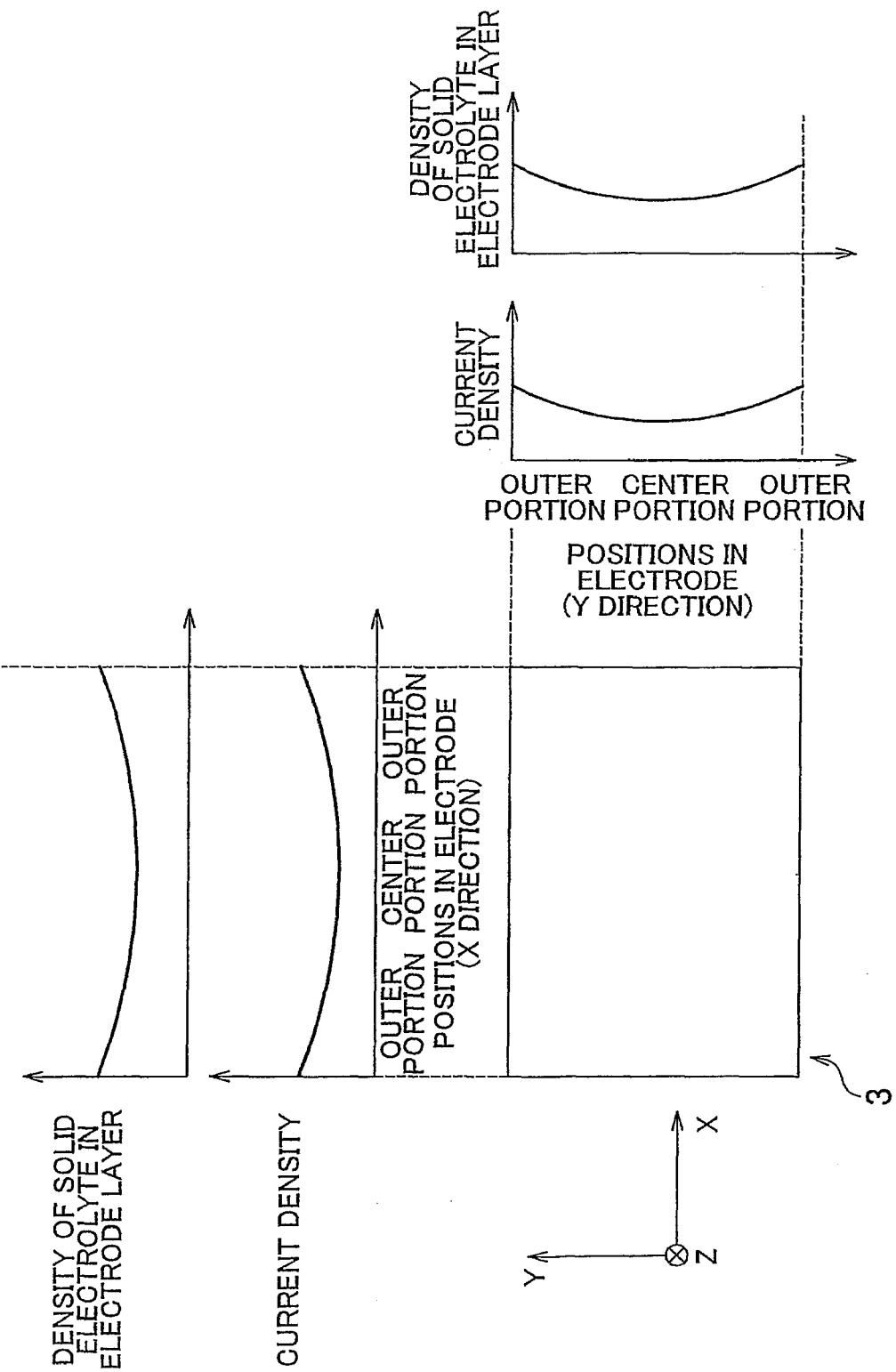

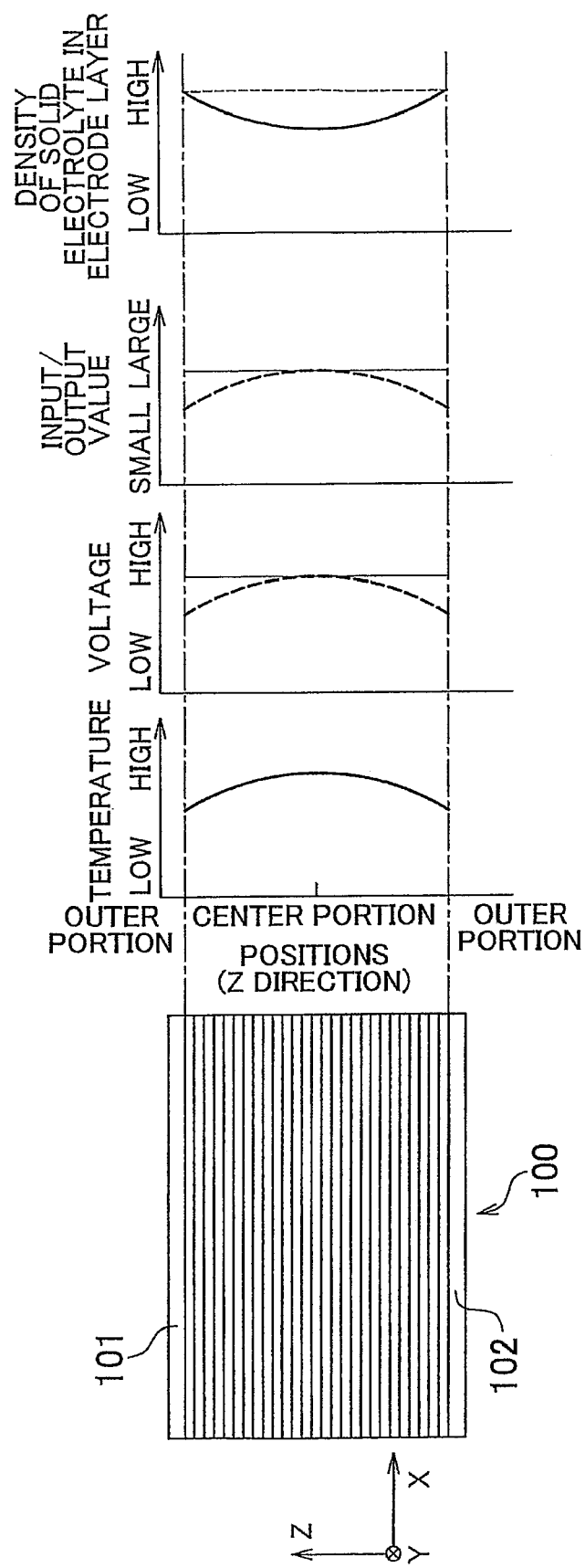

ELECTRODE STORAGE DEVICE

This is a division of application Ser. No. 12/438,469 filed 23 Feb. 2009, which is a 371 national phase application of PCT/IB2007/002398 filed 22 Aug. 2007, claiming priority to Japanese Patent Applications No. 2006-229359 filed 25 Aug. 2006, and No. 2007-038881 filed 20 Feb. 2007, respectively, the contents of which are incorporated herein by reference.

BACKGROUND OF THE INVENTION

1. Field of the Invention

The invention relates to an electric storage device.

2. Description of the Related Art

A secondary battery is widely used as a power source for a portable electronic device such as a laptop computer, or a cellular phone. The secondary battery is also used as a power source that provides power for an electric vehicle and the like. To suppress deterioration of the performance of the secondary battery, various proposals are made.

Japanese Patent Application Publication No. 2005-11660 (JP-A-2005-11660) describes an electrode for a secondary battery. In the electrode for a secondary battery, plural small cells, which serve as electrode layers, are formed on a current collector, which serves as a substrate, to reduce thermal stress due to a change in the temperature in the secondary battery.

The publication No. 2005-11660 (for example, FIGS. 1, 2, and 11) describes that the amount of a conductive agent varies among the plural small cells formed on the current collector so that temperature is uniform in the electrode for a secondary battery. More specifically, the amount of the conductive agent contained in the small cell positioned in the center portion of the current collector is smallest, and the amount of the conductive agent contained in the small cell positioned in the end portion of the current collector is largest.

However, in the electrode for a secondary battery described in the publication No. 2005-11660, there are regions where the small cells are formed, and regions where the small cells are not formed, on the surface of the current collector. With this configuration, because electric current does not flow in the regions where the small cells are not formed, the energy efficiency of the secondary battery decreases.

Also, the area of each small cell is extremely small as compared to the area of the current collector. Therefore, the small cells are likely to separate from the current collector, for example, in a process of manufacturing the electrode for a secondary battery, or in a process of disposing the secondary battery that includes the electrode for a secondary battery. When the plural small cells are formed on the current collector, the electrode for a secondary battery is easily bent. However, the small cells are likely to separate from the current collector due to stress when the electrode for a secondary battery is bent.

In the configuration where the amount of the conductive agent varies among the small cells so that the resistance value varies among the small cells, the resistance value is uniform in each small cell. Therefore, when the temperature varies in the region where each small cell is formed, it is not possible to suppress the variation in the temperature in the region.

When the amount of the conductive agent varies among the small cells, and the amount of an active material is substantially uniform in all the small cells, part of the active material is not used for charging/discharging of the secondary battery. That is, in the small cell that contains a small amount of the conductive agent, all the active material contained in the small cell may not be used for charging/discharging of the secondary battery. The raw material of the active material is relatively expensive. Therefore, if part of the active material is not used for charging/discharging of the secondary battery, the cost of the electrode for a secondary battery is increased.

SUMMARY OF THE INVENTION

The invention provides an electrode for an electric storage device, in which separation of an electrode layer from a current collector is suppressed, and variation in temperature in the surface of an electrode is suppressed. The invention also provides an electric storage device that includes the electrode for an electric storage device.

A first aspect of the invention relates an electrode used for an electric storage device that includes plural electrodes that are stacked such that an ion-conductive layer is disposed between each pair of the electrodes. The electrode includes a current collector; and an electrode layer, formed on the current collector, which contains an active material. The configuration of the electrode layer varies according to a position in the electrode layer such that a current density in a first region of the electrode, where heat radiation performance is lower than the heat radiation performance in a second region of the electrode, is lower than the current density in the second region of the electrode.

The amount of the active material in the electrode layer may vary according to the position in the electrode layer. For example, the amount of the active material in a region of the electrode layer, which is positioned in a center portion of the electrode, may be smaller than the amount of the active material in a region of the electrode layer, which is positioned in an end portion of the electrode. In the configuration where the plural electrodes are stacked, the amount of the active material in the region of the electrode layer, which is positioned in the center portion of the electrode, may be smaller than the amount of the active material in the region of the electrode layer, which is positioned in the end portion of the electrode, in two directions orthogonal to each other in the surface of each electrode (for example, in an X direction and a Y direction in the embodiments described later).

More specifically, the thickness of a region of the electrode layer, which is positioned in a center portion of the electrode, may be smaller than the thickness of a region of the electrode layer, which is positioned in an end portion of the electrode. The thickness of the electrode layer decreases continuously or in a stepwise manner, from an end portion of the electrode toward a center portion of the electrode. The density of the active material may be substantially uniform in the electrode layer.

Also, the density of the active material in a region of the electrode layer, which is positioned in a center portion of the electrode, may be lower than the density of the active material in a region of the electrode layer, which is positioned in an end portion of the electrode. The density of the active material may decrease continuously or in a stepwise manner, from an end portion of the electrode toward a center portion of the electrode. The electrode layer may have a substantially uniform thickness.

Further, the particle diameter of the active material in the electrode layer may vary according to the position in the electrode layer. For example, the particle diameter of the active material in a region of the electrode layer, which is positioned in a center portion of the electrode, may be larger than the particle diameter of the active material in a region of the electrode layer, which is positioned in an end portion of the electrode. When the electrode layer contains a conductive agent, the density of the conductive agent in the electrode layer varies according to the position in the electrode layer.

When the electrode layer contains a solid electrolyte, the density of the solid electrolyte in the electrode layer may vary according to the position in the electrode layer. Further, when the electrode layer contains plural solid electrolytes made of raw materials different from each other, a mixing ratio between the plural solid electrolytes in the electrode layer may vary according to the position in the electrode layer.

In an electric storage device according to the first aspect of the invention, the above-described electrode may be used as at least one of a positive electrode and a negative electrode.

When the above-described electrode for an electric storage device, which includes the electrode layer whose thickness varies, is used, and an ion-conductive layer contacts the electrode, the thickness of a region of the ion-conductive layer, which faces the center portion of the electrode, may be larger than the thickness of a region of the ion-conductive layer, which faces the end portion of the electrode. As the ion-conductive layer, a polymer solid electrolyte or an inorganic solid electrolyte may be used.

A second aspect of the invention relates to an electric storage device that includes plural electrodes that are stacked such that an ion-conductive layer is disposed between each pair of the electrodes. Each of the plural electrodes includes a current collector, and an electrode layer, formed on the current collector, which contains an active material. The amount of the active material varies among the plural electrodes such that a current density in the electrodes disposed in a center portion and/or an outer portion of the electric storage device is lower than the current density in the electrode disposed in another portion of the electric storage device.

The amount of the active material may vary according to the position in the electrode layer in each of the plural electrodes such that the current density in a first region of each of the plural electrodes, where heat radiation performance is lower than the heat radiation performance in a second region of each of the plural electrodes, is lower than the current density in the second region of each of the plural electrodes.

An electrode used for an electric storage device that includes plural electrodes that are stacked such that an ion-conductive layer is disposed between each pair of the electrodes may include a current collector, and an electrode layer, formed on the current collector, which contains an active material. A raw material of the active material or a mixing ratio (a volume ratio or a weight ratio) between plural raw materials that constitute the active material may vary according to the position in the electrode layer such that a current density in a first region of the electrode, where heat radiation performance is lower than the heat radiation performance in a second region of the electrode, is lower than the current density in the second region of the electrode.

A third aspect of the invention relates to an electric storage device that includes plural electrodes and plural ion-conductive layers that are stacked such that each of the plural ion-conductive layers is disposed between a pair of the electrodes among the plural electrodes. Each of the plural electrodes includes a current collector, and an electrode layer, formed on the current collector, which contains an active material. A first electrode among the plural electrodes is disposed in a position where heat radiation performance is lower than the heat radiation performance in a position where a second electrode among the plural electrodes is disposed, in a stacking direction in which the plural electrodes are stacked in the electric storage device. For example, the first electrode is positioned in a center portion of the electric storage device in the stacking direction. The configuration of the electrode layer in the first electrode differs from the configuration of the electrode layer in the second electrode such that a resistance value in the first electrode is larger than the resistance value in the second electrode.

The particle diameter of the active material in the electrode layer in the first electrode may be larger than the particle diameter of the active material in the electrode layer in the second electrode. When the electrode layer in each of the plural electrodes contains a conductive agent, the density of the conductive agent in the electrode layer in the first electrode may be lower than the density of the conductive agent in the electrode layer in the second electrode.

Further, when the electrode layer in each of the plural electrodes contains a solid electrolyte, the density of the solid electrolyte in the electrode layer in the first electrode may be lower than the density of the solid electrolyte in the electrode layer in the second electrode, or a raw material of the solid electrolyte in the electrode layer in the first electrode may differ from the raw material of the solid electrolyte in the electrode layer in the second electrode. When the electrode layer in each of the plural electrodes contains plural solid electrolytes made of raw materials different from each other, a mixing ratio between the plural solid electrolytes in the electrode layer in the first electrode may differ from the mixing ratio between the plural solid electrolytes in the electrode layer in the second electrode. In this case, an ion conductivity in the electrode layer in the first electrode may be lower than the ion conductivity in the electrode layer in the second electrode.

According to the above aspects of the invention, the configuration of the electrode layer (more specifically, for example, the amount of the active material in the electrode layer) may vary such that the current density in the region of the electrode, where the heat radiation performance is lower than the heat radiation performance in the other region of the electrode, is lower than the current density in the other region of the electrode. This suppresses the variation in the temperature in the surface of the electrode.

Because the amount of the active material in the electrode layer varies, the variation in the temperature is suppressed. Therefore, the small electrode layers (electrode layers whose areas are small, i.e., small cells) need not be used, unlike the electrode described in the publication No. 2005-11660. That is, according to the above aspects of the invention, it is possible to increase the area of the current collector, on which the electrode layer is formed. Therefore, the energy efficiency of the electric storage device is improved, and separation of the electrode layer from the current collector is suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 9 shows the relation between positions in the electrode, and the particle diameter of the active material;

FIGS. 10A to 10E show the relations between positions in the stacking direction of the bipolar battery, and temperature, a voltage value, an input/output value, and the particle diameter of the active material in the electrode layer;

FIG. 11 shows the relation between positions in the electrode and the density of a conductive agent in the electrode layer;

FIG. 13 shows the relation between the positions in the electrode and the density of a solid electrolyte in the electrode layer; and FIGS. 14A to 14E show the relations between the positions in the stacking direction of the bipolar battery, and the temperature, the voltage value, the input/output value, and the density of the solid electrolyte in the electrode layer.

DETAILED DESCRIPTION OF THE EXAMPLE EMBODIMENTS

Hereinafter, an embodiment of the invention will be described.

First Embodiment

Figure 1:
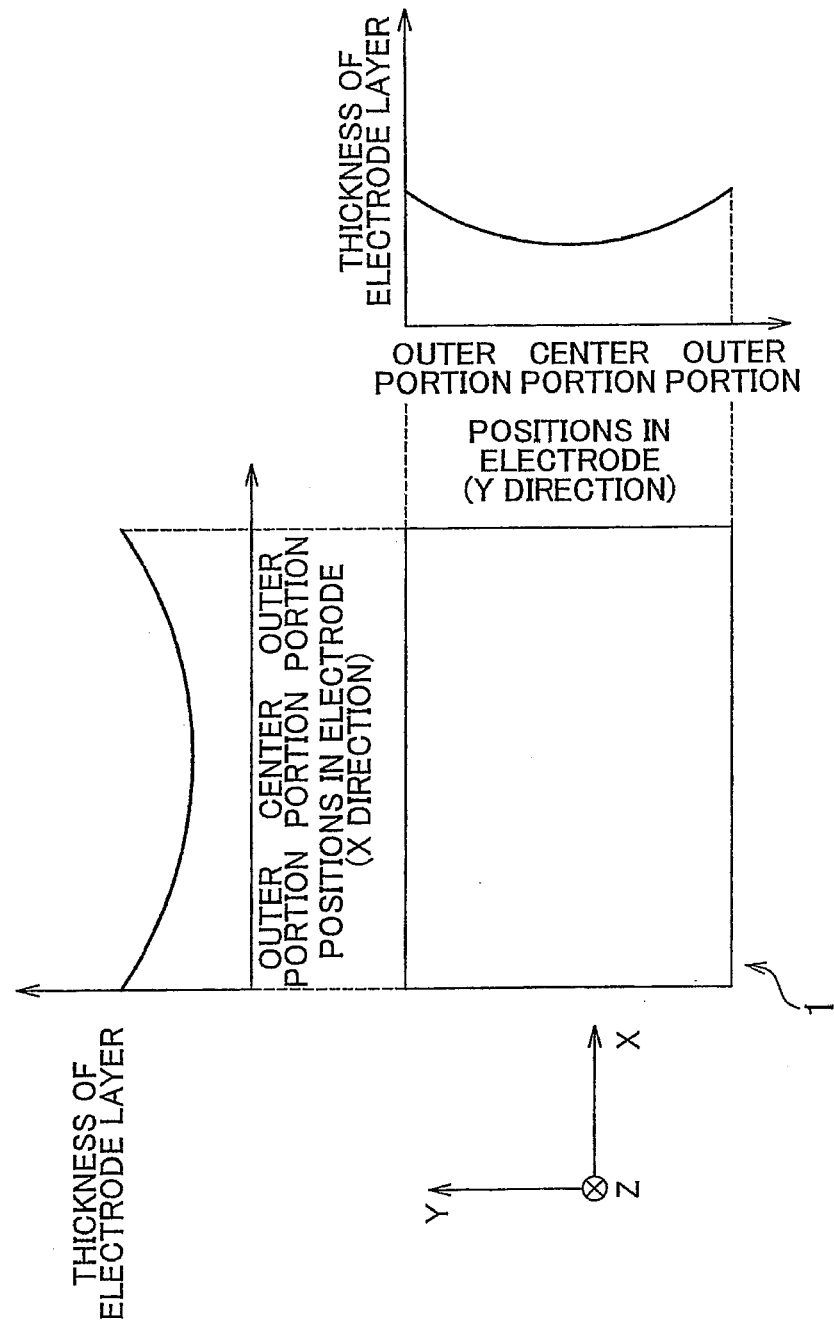
FIG. 1 shows the relation between positions in an electrode, and the thickness of an electrode layer in a first embodiment of the invention.
Figure 2:
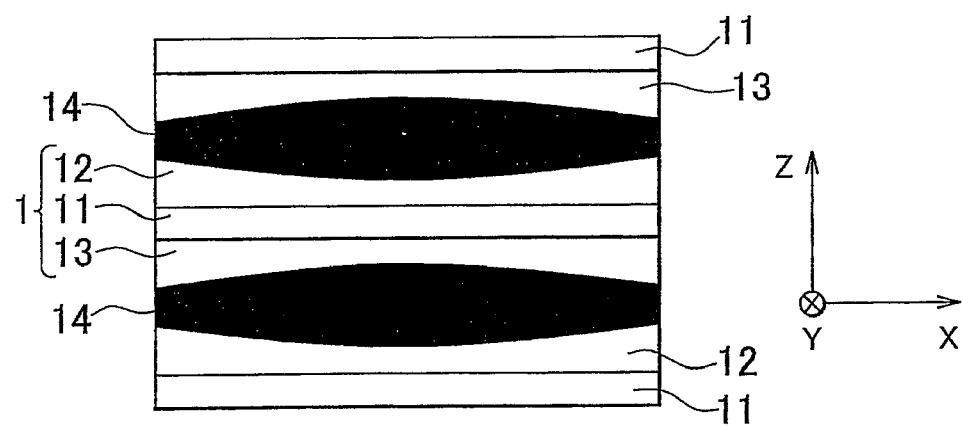
FIG. 2 is a lateral view of a bipolar battery in the first embodiment.

A bipolar battery, which is an electric storage device according to a first embodiment of the invention, will be described with reference to FIG. 1 and FIG. 2. FIG. 1 shows a front view of a bipolar electrode that is used in a bipolar battery according to the embodiment, and diagrams showing the relation between positions in the bipolar electrode, and the thickness of an electrode layer. FIG. 2 shows a lateral view of a portion of the bipolar battery that has a structure in which the bipolar electrodes are stacked.

In the bipolar electrode, a positive electrode layer is formed on one surface of a current collector, and a negative electrode layer is formed on the other surface of the current collector. FIG. 1 shows the one surface of the bipolar electrode (i.e., the surface on which the positive electrode layer is formed).

In the bipolar electrode according to the embodiment, the positive electrode layer and the negative electrode layer have the same configuration.

Although a bipolar secondary battery will be described in the following embodiment, the invention may be applied to a secondary battery other than the bipolar secondary battery. In the secondary battery other than the bipolar secondary battery, an electrode, in which the same electrode layer (the positive electrode layer or the negative electrode layer) is formed on each of both surfaces of the current collector, is used, or an electrode, in which the electrode layer is formed on only one surface of the current collector, is used.

Further, although the secondary battery will be described in the following embodiment, the invention may be applied to a stacked capacitor (an electric double layer capacitor) that is the electric storage device. In the stacked capacitor, plural positive electrodes and negative electrodes are alternately stacked such that a separator is disposed between each pair of the positive electrode and the negative electrode. In the stacked capacitor, for example, an aluminum foil may be used as the current collector, activated carbon may be used as a positive electrode active material and a negative electrode active material, and a porous membrane made of polyethylene may be used as the separator.

In FIG. 1 and FIG. 2, the bipolar electrode 1 includes a current collector 11 that serves as a substrate. A positive electrode layer 12 is formed on one surface (X-Y flat surface) of the current collector 11. A negative electrode layer 13 is formed on the other surface of the current collector 11 (refer to FIG. 2).

The current collector 11 may be formed using an aluminum foil, or plural metals (alloy). The current collector 11 may be formed by coating the surface of metal with aluminum.

Instead of the bipolar electrode, an electrode that includes a so-called composite current collector may be used. The composite current collector is formed by attaching plural metal foils together. When the composite current collector is used, aluminum and the like may be used as the raw materials of the current collector of the positive electrode, and nickel, copper, and the like may be used as the raw materials of the current collector of the negative electrode. In the composite current collector, the current collector of the positive electrode may directly contact the current collector of the negative electrode, or a conductive layer may be provided between the current collector of the positive electrode and the current collector of the negative electrode.

Each of the electrode layers 12 and 13 contains the active material, a conductive agent, an electrolyte (for example, a solid electrolyte), an additive agent, and the like, according to whether the electrode layer is the positive electrode layer or the negative electrode layer. As the raw materials that constitute each of the electrode layers 12 and 13, known materials may be used.

For example, in a nickel-hydrogen battery, nickel oxide may be used as the active material of the positive electrode layer 12, and hydrogen storing alloy such as $NmNi_{(5-x-y-z)}Al_xMn_yCo_z$ (Nm: misch metal) may be used as the active material of the negative electrode layer 13. In a lithium secondary battery, lithium-transition metal composite oxide may be used as the active material of the positive electrode layer 12, and carbon may be used as the active material of the negative electrode layer 13. Acetylene black, carbon black, graphite, carbon fiber, or carbon nanotube may be used as the conductive agent.

The electrode layers 12 and 13 may be formed on the current collector 11 using, for example, an ink-jet method.

In the X direction in FIG. 1 and FIG. 2, the thickness of each of the electrode layers 12 and 13 (i.e., the length of each of the electrode layers 12 and 13 in the Z direction) is smallest in a region positioned in the center portion of the bipolar electrode 1. The thickness of each of the electrode layers 12 and 13 continuously increases from the center portion of the bipolar electrode 1 toward each outer portion of the bipolar electrode 1. In the Y direction in FIG. 1 as well, the thickness of each of the electrode layers 12 and 13 is smallest in a region positioned in the center portion of the bipolar electrode 1. The thickness of each of the electrode layers 12 and 13 continuously increases from the center portion of the bipolar electrode 1 toward each outer portion of the bipolar electrode 1. That is, the surface of each of the electrode layers 12 and 13 (the surface that contacts an ion-conductive layer 14 described later) has the surface that has a concave shape (i.e., the surface that has a curvature).

Figure 3:
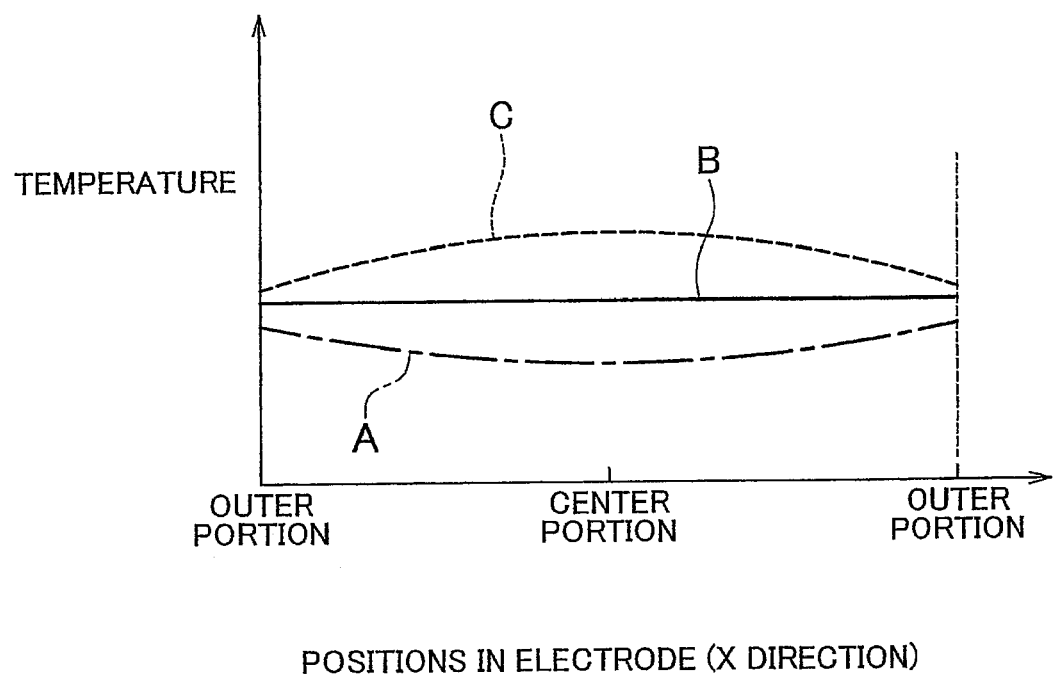
FIG. 3 is a diagram showing temperature distribution according to a position in the electrode.

The thickness of each of the electrode layers 12 and 13 may be set based on the temperature distribution in a conventional bipolar electrode (i.e., an electrode in which an electrode layer having a substantially uniform thickness is formed on the surface of a current collector). FIG. 3 shows the relation between the positions and temperature in the bipolar electrode. In FIG. 3, the vertical axis indicates the temperature in the bipolar electrode. The horizontal axis indicates the positions in the bipolar electrode in the X direction (or the Y direction).

In FIG. 3, the dotted line indicates a temperature distribution curve C when the conventional bipolar electrode is used. As shown by the temperature distribution curve C, the temperature is highest in the center portion of the bipolar electrode, and the temperature decreases toward each outer portion of the bipolar electrode. That is, because heat tends to be confined in the center portion of the bipolar electrode, and heat transfer to the outside of the bipolar electrode is low (heat radiation performance is low) in the center portion of the bipolar electrode, the temperature in the center portion is higher than the temperature in the other portion.

When the temperature varies in the bipolar electrode as shown by the temperature distribution curve C, the performance of the bipolar battery is likely to deteriorate.

In the configuration described in Japanese Patent Application Publication No. 2005-11660 (JP-A-2005-11660), that is, in the configuration in which plural small cells, which serve as the electrode layers, are formed in a matrix manner or the like, the temperature distribution is substantially the same as the temperature distribution shown by the temperature distribution curve C. That is, the temperature in the center portion of the electrode is higher than the temperature in each outer portion of the electrode.

Accordingly, in the embodiment, the thickness of the region of each of the electrode layers 12 and 13, which is positioned in the center portion of the bipolar electrode, is smaller than the thickness of the region positioned in the other portion of the bipolar electrode. In the embodiment, the density of the active material is substantially uniform in all regions of each of the electrode layers 12 and 13. Therefore, by decreasing the thickness of the region of each of the electrode layers 12 and 13, which is positioned in the center portion of the bipolar electrode, the amount of the active material is decreased in the region whose thickness is decreased.

By decreasing the amount of the active material, a current density in the bipolar electrode is decreased. This suppresses heat generation caused by charging/discharging of the bipolar battery. By suppressing the heat generation in the center portion of the bipolar electrode, the variation in the temperature in the bipolar electrode is suppressed as described later.

The thickness of each of the electrode layers 12 and 13 may be zero in the center portion of the bipolar electrode 1.

When the bipolar electrode 1 according to the embodiment is used, the temperature distribution curve matches the curve A shown by the dashed line in FIG. 3 in the initial phase of the operation of the bipolar electrode 1. Because the thickness of the region of each of the electrode layers 12 and 13, which is positioned in the center portion of the bipolar electrode 1, is smaller than the thickness of the region positioned in each outer portion of the bipolar electrode 1, the temperature in the center portion may be lower than the temperature in each outer portion in the initial phase of the operation.

However, as the time elapses, the curve that shows the temperature distribution in the bipolar electrode is changed from the curve A shown by the dashed line to the curve B shown by the solid line.

Because the heat radiation performance in the center portion of the bipolar electrode 1 is lower than the heat radiation performance in the other portion of the bipolar electrode 1, the temperature in the center portion gradually increases. Accordingly, the thickness of the region of each of the electrode layers 12 and 13, which is positioned in the center portion of the bipolar electrode 1, is set in advance taking into account the increase in the temperature. Thus, the temperature is made substantially uniform in the entire bipolar electrode 1, as shown by the temperature distribution curve B in FIG. 3. When the bipolar battery according to the embodiment is actually used, it is preferable to use the bipolar battery when the temperature distribution curve matches the solid curve B in FIG. 3.

The ion-conductive layer 14 is formed on each of the electrode layers 12 and 13 in the bipolar electrode 1 such that the ion conductive layer 14 contacts each of the electrode layers 12 and 13. That is, in the bipolar battery that has the stacking structure, the ion-conductive layer 14 is disposed between the electrode layers 12 and 13.

As the ion-conductive layer 14, a polymer solid electrolyte that has an ion conductivity (for example, polyethylene oxide, or polypropylene oxide), or an inorganic solid electrolyte that has an ion conductivity (for example, lithium nitride, halide, oxoacid salt, or phosphorus sulfide) may be used. In the electrode that is used in a battery other than the bipolar battery, a polymer gel electrolyte may be used as the ion-conductive layer.

In the embodiment, the thickness of the ion-conductive layer 14 (i.e., the length of the ion-conductive layer 14 in the Z direction in FIG. 2) is largest in a region that faces the center portion of the bipolar electrode 1. The thickness of the ion-conductive layer 14 gradually decreases toward each outer portion of the bipolar electrode 1.

As described above, in the embodiment, the thickness of each of the electrode layers 12 and 13 increases from the center portion toward each outer portion. Therefore, if an ion-conductive layer (particularly, a solid electrolyte layer) that has a substantially uniform thickness (including manufacturing tolerance) is used, a portion of the ion-conductive layer 14 does not contact either of the electrode layers 12 and 13. Accordingly, the thickness of the ion-conductive layer 14 is set in the above-described manner so that the entire surface of the ion-conductive layer 14 contacts each of the electrode layers 12 and 13. Thus, intervals between the bipolar electrodes 1 (current collectors 1) in a stacking direction in which the bipolar electrodes 1 are stacked (i.e., in the Z direction in FIG. 2) are made substantially uniform (when manufacturing tolerance is taken into account).

Figure 4:
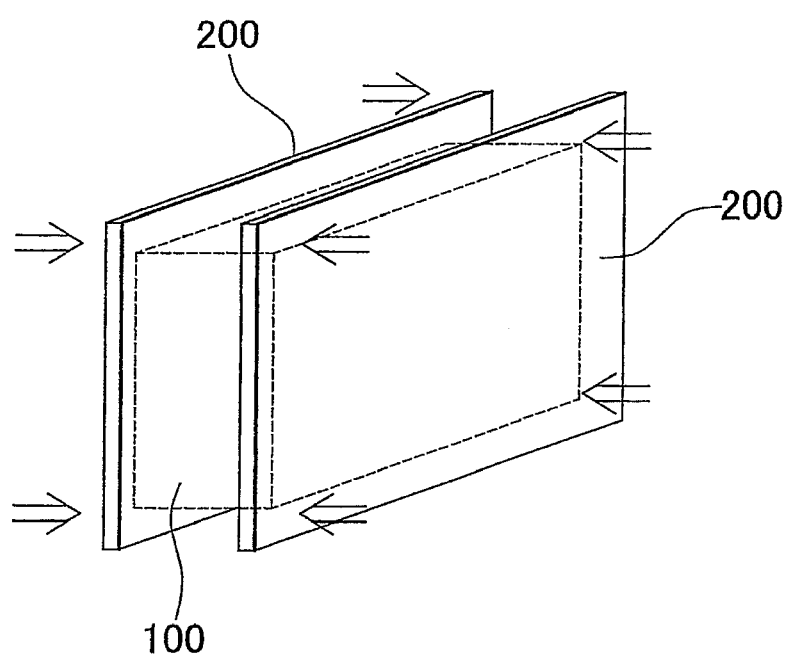
FIG. 4 is a schematic diagram showing a support structure for the bipolar battery in the first embodiment.

In the bipolar battery according to the embodiment, a bipolar battery 100 is supported by support members 200 disposed on both sides of the bipolar battery 100 (in the stacking direction in which the bipolar electrodes 1 are stacked) as shown in FIG. 4, mainly to suppress heat expansion in the bipolar electrode 1. More specifically, the outer portions of the bipolar battery 100 are supported by the support members 200, as shown by the arrows in FIG. 4.

With this configuration, heat expansion is suppressed in each outer portion of the bipolar battery 100. However, heat expansion is not suppressed in the center portion of the bipolar battery 100. Thus, only the center portion of the bipolar battery 100 may be deformed due to the heat expansion.

By using the bipolar electrode 1 according to the embodiment, the variation in the temperature in the bipolar electrode 1 is suppressed, and therefore, the heat expansion is suppressed in the center portion of the bipolar battery 100. Therefore, even if the structure shown in FIG. 4 is employed, it is possible to avoid a situation where only the center portion of the bipolar battery 10 is deformed due to the heat expansion.

Also, in the embodiment, each of the electrode layers 12 and 13 is formed on the entire surface of the current collector 11. Therefore, as compared to the configuration where the plural small cells (electrode layers) are formed on the current collector as described in the publication No. 2005-11660, the electrode layers 12 and 13 are easily formed on the current collector 11, and separation of the electrode layers 12 and 13 from the current collector 11 is suppressed. That is, in the embodiment, because the amount of the active material in each of the electrode layers 12 and 13 varies, the size of each of the electrode layers 12 and 13 does not need to be reduced, unlike the small cells described in the publication No. 2005-11660. Thus, it is possible to increase the area of the current collector 11, on which each of the electrode layers 12 and 13 is formed.

By forming each of the electrode layers 12 and 13 on the entire surface of the current collector 11, the effective area that is used as the electrode is increased, and the energy efficiency of the bipolar battery is improved, as compared to the case where there are regions where no electrode layer is formed, on the current collector 11.

In the embodiment, the thickness of each of the electrode layers 12 and 13 continuously varies in the X direction and Y direction of the bipolar electrode 1. However, the thickness of each of the electrode layers 12 and 13 may change in one of the X direction and Y direction. In this case, it is possible to suppress the variation in the temperature distribution in the bipolar electrode, in the direction in which the thickness of each of the electrode layers 12 and 13 varies.

The thickness of only one of the electrode layers 12 and 13 (i.e., the thickness of the positive electrode layer or the negative electrode layer) may vary. In this case, the surface of the ion-conductive layer, which contacts the electrode layer whose thickness does not vary, is substantially flat (taking manufacturing tolerance into account).

Figure 5:
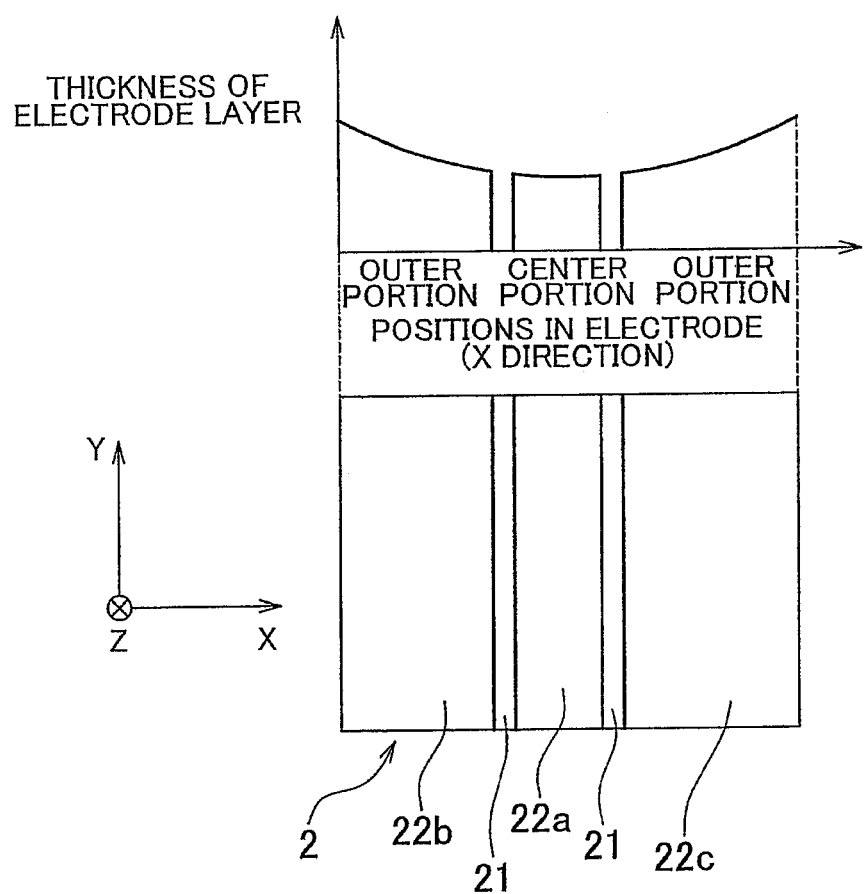
FIG. 5 shows the relation between positions in an electrode and the thickness of an electrode layer in a modified example of the first embodiment.
Figure 6:
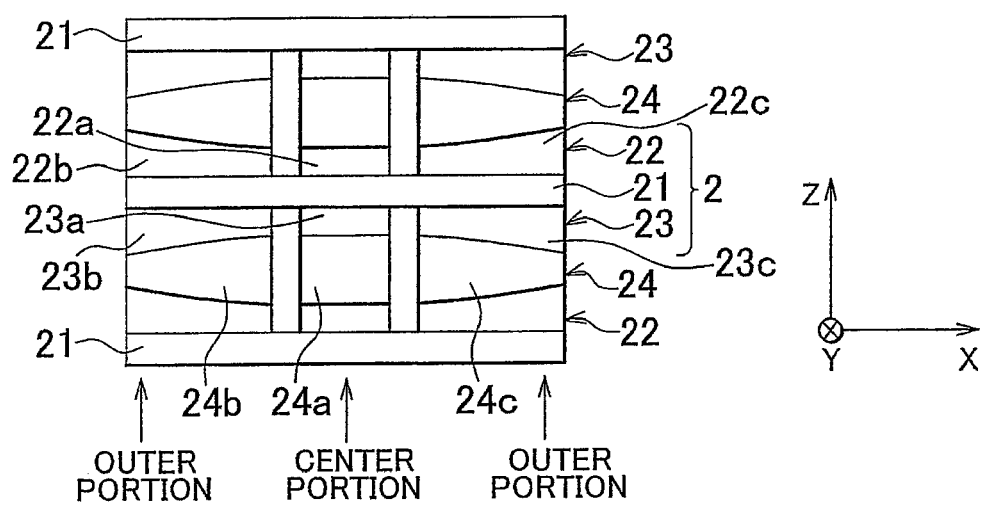
FIG. 6 is a lateral view of a bipolar battery in the modified example of the first embodiment.

Further, although each of the electrode layers 12 and 13 is formed on the entire surface of the current collector 11 in the embodiment, there may be regions in which no electrode layer is formed, on the current collector 11. More specific description will be made with reference to FIG. 5 and FIG. 6. FIG. 5 shows a front view of a bipolar electrode in the modified example of the embodiment, and a diagram showing the relation between positions in the bipolar electrode and the thickness of the electrode layer. FIG. 6 is a lateral view of a bipolar battery in which the bipolar electrodes in the modified example are used.

As shown in FIG. 5 and FIG. 6, a positive electrode layer 22 and a negative electrode layer 23 are formed in each of three regions on the current collector 21. There are regions where no electrode layer is formed, between adjacent electrode layers 22, and between adjacent electrode layers 23, in the X direction in FIG. 5. The regions where no electrode layer is formed are positioned in the center portion of a bipolar electrode 2.

In a first positive electrode layer 22a positioned in the center portion of the bipolar electrode 2, the thickness is smallest in the center portion, and the thickness continuously increases toward each outer portion of the bipolar electrode 2. In a second positive electrode layer 22b, the thickness is smallest in an end portion positioned in the center portion of the bipolar electrode 2 (in other words, an end portion positioned close to the first electrode layer 22a). However, the thickness of the end portion of the second positive electrode layer 22b is larger than the thickness of the end portion of the first positive layer 22a. The thickness of the second positive layer 22b continuously increases from the end portion toward the outer portion of the bipolar electrode 2.

A third positive electrode layer 22c has the same configuration as that of the second positive electrode layer 22b. That is, in the third positive electrode layer 22c, the thickness is smallest in an end portion positioned in the center portion of the bipolar electrode 2 (in other words, an end portion positioned close to the first positive electrode layer 22a). However, the thickness of the end portion of the third positive electrode layer 22c is larger than the end portion of the first positive electrode layer 22a. The thickness of the third positive electrode layer 22c continuously increases from the end portion toward the outer portion of the bipolar electrode 2.

The density of the active material is substantially uniform in the positive electrode layers 22a to 22c.

The negative electrode layers 23 have the same configurations as those of the positive electrode layers 22. The negative electrode layers 23 include a first negative electrode layer 23a that faces the first positive layer 22a, and a second negative electrode layer 23b and a third negative electrode layer 23c that face the second positive electrode layer 22b and the third positive electrode layer 22c. The density of the active material is substantially uniform in the negative electrode layers 23a to 23c.

The ion-conductive layers 24 are formed in regions that face the regions where the electrode layers 22 and 23 are formed. The ion-conductive layers 24 include a first ion-conductive layer 24a positioned between the first positive electrode layer 22a and the first negative electrode layer 23a, a second ion-conductive layer 24b positioned between the second positive electrode layer 22b and the second negative electrode layer 23b, and a third ion-conductive layer 24c positioned between the third positive electrode layer 22c and the third negative electrode layer 23c.

The thickness of each of the ion-conductive layers 24a to 24c varies according to the thickness of each of the electrode layers 22a to 22c, and 23a to 23c such that the intervals between the adjacent current collectors 21 in the stacking direction are substantially uniform.

In the embodiment, on the current collector 21, there are regions (spaces) where the electrode layers 22 and 23 and the ion-conductive layer 24 are not formed. Thus, heat generated in the bipolar electrode 2 is radiated to the outside through the regions. Because the temperature is highest particularly in the center portion of the bipolar electrode 2, the heat in the bipolar electrode 2 is efficiently radiated, by providing the regions where the electrode layers 22 and 23 are not formed, in the center portion of the bipolar electrode 2.

Also, because the thickness of each of the electrode layers 22a to 22c and 23a to 23c varies, the variation in the temperature in each of the electrode layers 22a to 22c and 23a to 23c is suppressed. Further, because the thickness of the entire electrode layers 22 and the thickness of the entire electrode layers 23 vary in the same manner as in the first embodiment, the variation in the temperature in the bipolar electrode 2 is suppressed.

In the modified example shown in FIG. 5 and FIG. 6, the ion-conductive layers 24 are formed in the regions that face the regions where the electrode layers 22 and 23 are formed. However, the ion-conductive layers may be integrally formed (i.e., the single ion-conductive layer may be formed) as in the first embodiment (refer to FIG. 2). With this configuration, it is possible to avoid a situation where the adjacent current collectors 21 in the stacking direction contact each other, and short circuit occurs.

Also, in the modified example, there are two regions where the electrode layers 22 and 23 are not formed. However, the invention is not limited to this configuration. The number of regions where the electrode layers 22 and 23 are not formed may be appropriately set.

In the above-described embodiment and the modified example, the thickness of each of the electrode layers 22 and 23 continuously varies. However, the invention is not limited to this configuration. The thickness of the electrode layer may vary in a stepwise manner. For example, the thickness of the electrode layer may vary in the stepwise manner, along the curve showing the thickness of the electrode layer in FIG. 1. With this configuration, the variation in the temperature in the bipolar electrode is suppressed.

When the thickness of the electrode layer varies in the stepwise manner, the electrode layer may have at least two regions with different thicknesses. The number of regions with different thicknesses may be appropriately set.

In the above-described embodiment and the modified example, the thickness of the electrode layer varies according to the position in the bipolar electrode. In the bipolar battery in which the bipolar electrodes are stacked, the thickness of the electrode layer in the bipolar electrode may vary according to the position of the bipolar electrode in the thickness direction of the battery (i.e., in the direction in which the bipolar electrodes are stacked).

In the bipolar battery with the stacking structure, the degree of ease with which heat is radiated from the center portion of the bipolar battery in the stacking direction differs from the degree of ease with which heat is radiated from each outer portion of the bipolar battery in the stacking direction. As a result, the temperature distribution in the bipolar electrode positioned in the center portion of the bipolar battery in the stacking direction may differ from the temperature distribution in the bipolar electrode positioned in each outer portion of the bipolar battery in the stacking direction. Therefore, when the thickness of the electrode layer in the bipolar electrode varies according to the position of the bipolar electrode in the stacking direction, the variation in the temperature in the stacking direction is suppressed.

More specifically, the thickness of each electrode layer may be set such that the thickness of the electrode layer in the bipolar electrode positioned in the center portion of the bipolar battery is smaller than the thickness of the electrode layer in the bipolar electrode positioned in each outer portion of the bipolar battery, at positions facing each other in the stacking direction.

The bipolar electrode according to the embodiment or the modified example may be positioned in the center portion of the bipolar battery, and the conventional bipolar electrode (i.e., the bipolar electrode in which the electrode layer has a substantially uniform thickness) may be positioned in the outer portion of the bipolar battery.

Second Embodiment

Figure 7:
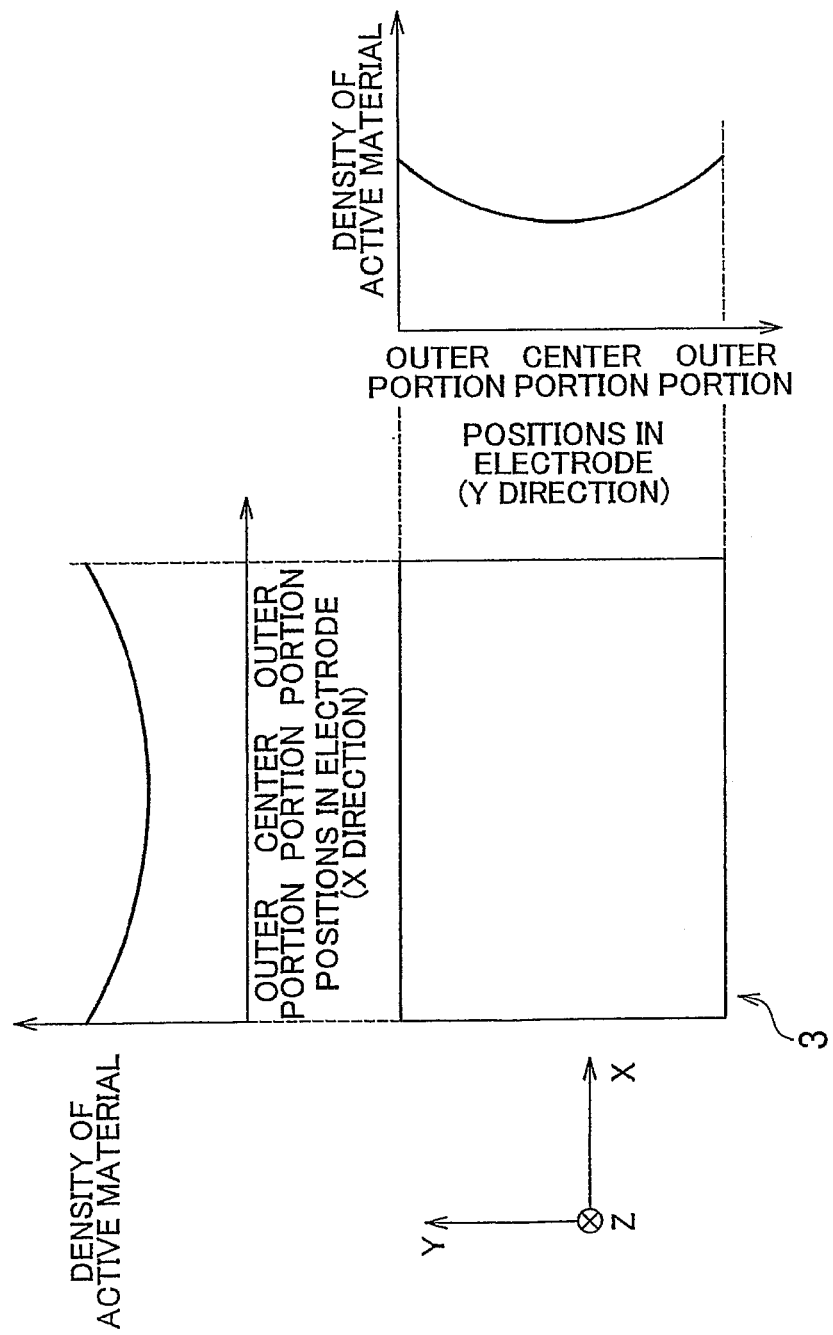
FIG. 7 shows the relation between positions in an electrode and the density of an active material in a second embodiment of the invention.
Figure 8:
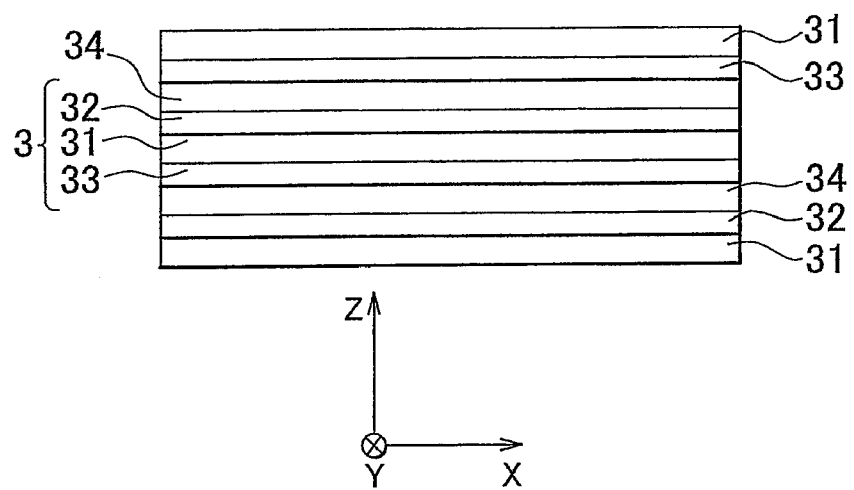
FIG. 8 is a lateral view of a bipolar battery in the second embodiment.

Next, a bipolar battery according to a second embodiment will be described with reference to FIG. 7 and FIG. 8. FIG. 7 shows a front view of a bipolar electrode used in the bipolar battery according to the second embodiment, and diagrams showing the relation between the density of the active material contained in the electrode layer in the bipolar electrode, and the positions in the bipolar electrode. FIG. 8 is a lateral view (schematic view) of the bipolar battery according to the embodiment.

In the above-described first embodiment, the thickness of the electrode layer varies in the X direction and Y direction of the bipolar electrode. In the second embodiment, the electrode layer has a substantially uniform thickness (when manufacturing tolerance is taken into account), and the density of the active material contained in the electrode layer varies. Hereinafter, more specific description will be made.

In a bipolar electrode 3 according to the embodiment, a positive electrode layer (electrode layer) 32 that has a substantially uniform thickness is formed on one surface of a current collector 31. A negative electrode layer (electrode layer) 33 that has a substantially uniform thickness is formed on the other surface of the current collector 31. In the bipolar battery in which the bipolar electrodes 3 are stacked, an ion-conductive layer 34 that has a substantially uniform thickness is disposed between the positive electrode layer 32 and the negative electrode layer 33.

As described in the first embodiment, each of the electrode layers 32 and 33 is constituted by the active material, the conductive agent, the additive agent, and the like, according to whether the electrode layer is the positive electrode layer or the negative electrode layer. In the embodiment, the density of the active material (i.e., the amount of the active material per unit volume of each of the electrode layers 32 and 33) varies according to the position in each of the electrode layers 32 and 33.

More specifically, as shown in FIG. 7, the density of the active material is lowest in the center portion of the bipolar electrode 3, and the density of the active material continuously increases toward each outer portion of the bipolar electrode 3 in the X direction and in the Y direction.

In the embodiment, each of the electrode layers 32 and 33 has a substantially uniform thickness as shown in FIG. 8. Therefore, because the density of the active material varies, the amount of the active material in each of the electrode layers 32 and 33 varies. Also, because the density of the active material varies, the densities of materials (i.e., the conductive agent and the like) other than the active material, which constitute each of the electrode layers 32 and 33, also vary. That is, in a region of each of the electrode layers 32 and 33, where the density of the active material is low (i.e., a region positioned in the center portion of the bipolar electrode 3), the densities of the conductive agent and the like are relatively high. In a region of each of the electrode layers 32 and 33, where the density of the active material is high (i.e., a region positioned in each outer portion of the bipolar electrode 3), the densities of the conductive agent and the like are relatively low.

The density of the active material in the center portion of the bipolar electrode 3 may be zero.

Because the density of the active material varies as described above, a current density in the bipolar electrode 3 varies. Thus, because the density of the active material in the center portion of the bipolar electrode 3 is lower than the density of the active material in each outer portion of the bipolar electrode 3, the current density in the center portion of the bipolar electrode 3 is lower than the current density in each outer portion of the bipolar electrode 3. This suppresses heat generation in the center portion of the bipolar electrode 3 caused by charging/discharging of the battery, and suppresses the variation in the temperature in the bipolar electrode 3.

Also, in the embodiment, because the density of the active material varies, each of the single electrode layer 32 and the single electrode layer 33 is formed on the substantially entire surface of the current collector 31. Thus, as compared to the configuration where the plural small cells (electrode layers) are formed on the current collector as described in the publication No. 2005-11660, the effective area that is used as the electrode is increased. Further, as compared to the small cells described in the publication No. 2005-11660, the area of each of the electrode layers 32 and 33 is increased. This suppresses the separation of each of the electrode layers 32 and 33 from the current collector 31.

The curve that shows the distribution of the density of the active material in FIG. 7 may be set based on the temperature distribution curve that shows the temperature distribution in the conventional bipolar electrode (i.e., the electrode in which the thickness of the electrode layer is substantially uniform, and the density of the active material is substantially uniform), as in the first embodiment.

The particle diameter of the active material may vary so that the density of the active material in the electrode layer varies. This configuration will be more specifically described with reference to FIG. 9. FIG. 9 shows a front view of the bipolar electrode used in the bipolar battery according to the embodiment, and diagrams showing the distribution of the current density and the distribution of the particle diameter of the active material in the electrode layer, according to the position in the bipolar electrode.

In the configuration shown in FIG. 9, the active material positioned in the center portion of the bipolar electrode 3 has the largest particle diameter, and the active material positioned in each outer portion of the bipolar electrode 3 has the smallest particle diameter. The particle diameter of the active material decreases from the center portion of the bipolar electrode 3 toward each outer portion of the bipolar electrode 3.

When the active material with a large particle diameter is used, the contact area between the particles of the active material (contact area per unit volume) is small. Also, the contact area between the particles of the active material and the ion-conductive layer 34 (contact area per unit volume) is small. Thus, in a region where the contact area is small, a reaction resistance due to charging/discharging of the battery is large, and the current density is small.

When the active material with a small particle diameter is used, the contact area between the particles of the active material (contact area per unit volume) is large, and the contact area between the particles of the active material and the ion-conductive layer 34 (contact area per unit volume) is large. Thus, in a region where the contact area is large, the reaction resistance due to charging/discharging of the battery is small.

As described above, in the region where the current density is low, heat generation caused by charging/discharging of the battery is suppressed. Therefore, because the active material with the large particle diameter is used in the center portion of the bipolar electrode 3, which is the region where the heat radiation performance is low, the increase in the temperature due to charging/discharging is suppressed. Thus, it is possible to suppress the variation in the temperature in the bipolar electrode 3.

Active material particles with different diameters may be prepared, and selectively used according to the position in the bipolar electrode 3 so that the particle diameter of the active material varies according to the position in the bipolar electrode 3. Alternatively, plural active material particles with different diameters may be prepared, and the mixing ratio between the active material particles with different diameters may vary according to the position in the bipolar electrode 3.

In the embodiment, the density of the active material continuously varies. However, the invention is not limited to this configuration. The density of the active material may vary in the stepwise manner. For example, the density of the active material may vary in the stepwise manner, along the curve showing the distribution of the density of the active material in FIG. 7. The electrode layer may contain the active material with at least two different densities.

The density of the active material in each of the electrode layers 32 and 33 may vary in one of the X direction and Y direction. In this case, it is possible to suppress the variation in the temperature in the bipolar electrode, in the direction in which the density of the active material in each of the electrode layers 32 and 33 varies.

Further, in the embodiment, the density of the active material varies so that the current density in the bipolar electrode varies. However, the raw material of the active material may vary so that the current density in the bipolar electrode varies. That is, the raw material of the active material used in the center portion of the bipolar electrode may have a larger resistance value than that of the raw material of the active material used in each outer portion of the bipolar electrode. In other words, the raw material of the active material used in each outer portion of the bipolar electrode may have a smaller resistance value than that of the raw material of the active material used in the center portion of the bipolar electrode.

When the mixture of plural raw materials is used as the active material, the mixing ratio (volume ratio or weight ratio) between the plural raw materials may vary. In this case as well, the mixing ratio is set so that the resistance value in the center portion of the bipolar electrode is larger than the resistance value in each outer portion of the bipolar electrode.

As the active material, for example, the mixture of at least two of lithium cobaltate, nickel acid lithium, and lithium manganate may be used.

Thus, when the raw material of the active material varies, or the mixing ratio between the plural raw materials that constitute the active material varies, the current density in the bipolar electrode varies. This suppresses the variation in the temperature in the bipolar electrode.

In the embodiment, the positive electrode layer 32 and the negative electrode layer 33 have the same configuration. However, one of the electrode layers 32 and 33 may have the configuration in the embodiment, and the other of the electrode layers 32 and 33 may have the same configuration as that of the conventional electrode layer (i.e., the density of the active material may be substantially uniform in the other of the electrode layers 32 and 33).

In the bipolar battery with the stacking structure, the configuration (for example, the density of the active material) of the electrode layer in the bipolar electrode may vary according to the position of the bipolar electrode in the stacking direction. For example, the density of the active material in the electrode layer in each bipolar electrode may be set such that the density of the active material in the electrode layer in the bipolar electrode positioned in the center portion of the bipolar battery is lower than the density of the active material in the electrode layer in the bipolar electrode positioned in each outer portion of the bipolar battery, at positions that face each other in the stacking direction. This suppresses the variation in the temperature in the stacking direction.

In the bipolar battery with the stacking structure, plural unit cells (power generation elements) are stacked. For example, in the configuration shown in FIG. 8, the unit cell is the power generation element that includes the ion-conductive layer 34 and the electrode layers 32 and 33.

The configuration where the density of the active material in the electrode layer in the bipolar electrode 3 varies according to the position of the bipolar electrode 3 in the stacking direction will be more specifically described with reference to FIGS. 10A to 10E. FIGS. 10A to 10E show the temperature distribution, the distribution of the voltage, the distribution of the input/output value, and the distribution of the particle diameter of the active material in the electrode layer, in the stacking direction of the bipolar battery with the stacking structure.

In FIG. 10A, a positive terminal 101 and a negative terminal 102, which are used for charging/discharging, are provided in the ends of the bipolar battery 100 in the stacking direction. The positive terminal 101 and the negative terminal 102 are connected to a circuit (not shown) that controls the charging/discharging of the bipolar battery 100.

As shown in FIG. 10B, in the bipolar battery 100 in which the plural unit cells are stacked, the temperature is not uniform in the stacking direction. The temperature is highest in the center portion of the bipolar battery 100, and is lowest in each outer portion of the bipolar battery 100, due to, for example, the heat generation caused by charging/discharging of the bipolar battery. The heat radiation performance in the unit cell positioned in the center portion of the bipolar battery 100 is lower than the heat radiation performance in the unit cell positioned in each outer portion of the bipolar battery 100. That is, heat tends to be confined in the unit cell positioned in the center portion of the bipolar battery 100.

In this case, if the particle diameter of the active material is substantially uniform in all the bipolar electrodes 3 in the stacking direction as in the conventional technology (refer to the dotted line in FIG. 10E), the resistance value is small in the unit cell positioned in the center portion of the bipolar battery 100 due to the increase in the temperature. As a result, as shown in the dotted lines in FIGS. 10C and 10D, the voltage value and the input/output value vary among the unit cells in the stacking direction.

If the particle diameter of the active material is substantially uniform in all the bipolar electrodes 3 in the stacking direction, the resistance value is substantially uniform in all the unit cells before the temperature varies in the stacking direction (in other words, before the bipolar battery 100 is used). However, because the temperature varies in the stacking direction due to the use of the bipolar battery 100 (for example, due to the charging/discharging), the resistance value varies in the stacking direction.

As described above, in the configuration shown in FIG. 10A, the particle diameter of the active material in the electrode layer (for example, the positive electrode layer) in the unit cell (bipolar electrode 3) varies according to the position of the unit cell (bipolar electrode 3) in the stacking direction.

More specifically, the particle diameter of the active material in the bipolar electrode 3 positioned in the center portion of the bipolar battery is largest, and the particle diameter of the active material in the bipolar electrode 3 positioned in each outer portion of the bipolar battery is smallest. The particle diameter of the active material in the bipolar electrode 3 gradually decreases from the center portion of the bipolar battery toward each outer portion of the bipolar battery. The particle diameter of the active material is substantially uniform in each bipolar electrode 3 (when manufacturing tolerance is taken into account).

As described above, by increasing the particle diameter of the active material in the unit cell, the resistance value in the unit cell is increased. By decreasing the particle diameter of the active material in the unit cell, the resistance value in the unit cell is decreased.

Thus, when the resistance value in the unit cell is set in advance to vary according to the position of the unit cell in the stacking direction, the variation in the resistance value among the unit cells in the stacking direction is suppressed, even if the temperature distribution shown in FIG. 10B occurs due to, for example, charging/discharging of the bipolar battery 100. By suppressing the variation in the resistance value, the variation in the voltage value and the variation in the input/output value in the bipolar battery 100 are suppressed. For example, as shown by the solid lines in FIGS. 10C and 10D, the voltage value and the input/output value are made substantially uniform.

The distribution of the particle diameter shown in FIG. 10E may be set based on the temperature distribution in the stacking direction (FIG. 10B). That is, by determining in advance the temperature distribution in the stacking direction caused by, for example, charging/discharging of the bipolar battery 100, it is possible to determine the amount of change in the voltage in each unit cell due to the change in the temperature.

The resistance value (the particle diameter of the active material) in each unit cell may be set based on the amount of change in the voltage in each unit cell. That is, the resistance value (the particle diameter of the active material) in each unit cell may be set to suppress the variation in the voltage value in the stacking direction after the voltage in each unit cell changes.

With the configuration shown in FIG. 10A, it is possible to suppress the variation in the voltage value and the variation in the input/output value among the unit cells in the stacking direction. Therefore, it is possible to execute a charging/discharging control for all the unit cells in the bipolar battery 100, using the same criteria.

It is known that if in the secondary battery, the input/output voltage is out of a range from an upper limit voltage to a lower limit voltage, the input/output voltage generally has an adverse effect on battery life. Therefore, to increase the battery life, charging/discharging is performed so that the input/output voltage is in the range from the upper limit voltage to the lower limit voltage (a fail-safe). In the embodiment, the charging/discharging control is executed for all the unit cells under the same condition.

Further, because resistance values in all the unit cells in the stacking direction are set with respect to the resistance value in the unit cell positioned in the center portion of the bipolar battery, the input/output value is equivalent to the largest input/output value in the conventional bipolar battery (shown by the dotted line), as shown in FIG. 10D.

The bipolar electrode in the embodiment may be used in the center portion of the bipolar battery, and the conventional bipolar electrode (i.e., the electrode in which the density of the active material is substantially uniform) may be used in the outer portion of the bipolar battery.

In the embodiment, the thickness of each of the electrode layers 32 and 33 is substantially uniform, and the density of the active material in each of the electrode layers 32 and 33 varies. However, the thickness of each of the electrode layers 32 and 33 may vary while the density of the active material in each of the electrode layers 32 and 33 varies. In this case, by appropriately setting the two parameters, that is, the density of the active material and the thickness of each of the electrode layers 32 and 33, the variation in the temperature in the bipolar electrode is suppressed.

The secondary battery (or the capacitor) in each of the first and second embodiments may be used as an electric storage device for driving a motor in, for example, an electric vehicle (EV), a hybrid vehicle (HEV), or a fuel-cell vehicle (FCV).

In each of the first and second embodiments, the amount of the active material in the electrode layer (more specifically, the thickness of the electrode layer and/or the density of the active material in the electrode layer) is set to vary, taking into account the heat radiation characteristic of the bipolar electrode. However, when the temperature varies in the bipolar electrode due to thermal influence from the outside, the amount of the active material in the electrode layer may be set to vary, taking the thermal influence into account. Hereinafter, more specific description will be made.

For example, in the case where a heat source (for example, an engine or a motor) is disposed close to the bipolar battery, the temperature in a region of the bipolar battery that is close to the heat source is higher than the temperature in the other region (in other words, the heat radiation performance deteriorates in the region close to the heat source) due to the thermal influence from the heat source.

Thus, the amount of the active material in the region of the bipolar electrode, which is close to the heat source, is made smaller than the amount of the active material in the other region of the bipolar electrode. This suppresses the variation in the temperature in the bipolar electrode. That is, as in each of the first and second embodiments, because the amount of the active material varies, the current density varies, and the increase in the temperature in the bipolar electrode is suppressed. As in the configuration shown in FIG. 9, the particle diameter of the active material in the electrode layer may vary.

The amount of the active material in the electrode layer may be set, taking into account the temperature distribution characteristic in the bipolar electrode based on the thermal influence from the heat source (the temperature distribution characteristic in the bipolar electrode is predictable in advance).

For example, in addition to, or instead of the configuration of the bipolar electrode in each of the first and second embodiments, the amount of the active material in the region of the bipolar electrode, which is close to the heat source (i.e., the region in one of the outer portions of the bipolar electrode), may be smaller than the amount of the active material in the other region (i.e., the region in the other of the outer portions of the bipolar electrode). Thus, it is possible to suppress the variation in the temperature in the bipolar electrode due to the heat generation caused by charging/discharging of the battery, and the heat generation caused by the thermal influence from the outside.

When the increase in the temperature is largest (i.e., the heat radiation performance is lowest) in the region of the bipolar electrode, which is close to the heat source, because of the thermal influence from the heat source, the amount of the active material in the region close to the heat source may be smallest.

When a heat source is disposed close to one side of the bipolar battery in which the plural bipolar electrodes are stacked in each of the first and second embodiments, at least one bipolar electrode among the plural bipolar electrodes, which is positioned in the one side of the bipolar battery that is close to the heat source, is susceptible to the thermal influence from the heat source. Accordingly, the configuration of the electrode layer in the at least one bipolar electrode positioned in the side close to the heat source may differ from the configuration of the electrode layer(s) in the other bipolar electrode(s) positioned in the side opposite to the heat source.

More specifically, the amount of the active material in at least one bipolar electrode among the plural bipolar electrodes, which is positioned in the one side close to the heat source (i.e., in one of the outermost portions of the bipolar battery in the stacking direction) may be smaller than the amount of the active material in the other bipolar electrode(s) (for example, the bipolar electrode positioned in the other of the outermost portions of the bipolar battery in the stacking direction). That is, the amount of the active material in at least one bipolar electrode among the plural bipolar electrodes may differ from the amount of the active material in the other bipolar electrode(s), in regions that face each other in the stacking direction. Also, as in the configuration shown in FIG. 10A, the particle diameter of the active material in the electrode layer in the bipolar electrode may vary according to the position of the bipolar electrode in the stacking direction.

When the amount of the active material in the bipolar electrode varies according to the position of the bipolar electrode in the stacking direction, for example, the amount of the active material in the bipolar electrode positioned in the center portion of the bipolar battery in the stacking direction, and the amount of the active material in the bipolar electrode positioned in the outermost portion of the bipolar battery that is close to the heat source may be smaller than the amount of the active material in the other bipolar electrode. With this configuration, even when the bipolar battery receives the thermal influence from the heat source, the variation in the temperature in the stacking direction is suppressed.

When the temperature is highest (in other words, the heat radiation performance is lowest) in the bipolar electrode positioned in the outermost portion of the bipolar battery that is close to the heat source, the amount of the active material in this bipolar electrode may be smallest.

In the configuration where the amount of the active material in the bipolar electrode varies according to the position of the bipolar electrode in the stacking direction, the bipolar electrode(s) in the first embodiment and/or the bipolar electrode in the second embodiment may be used, and/or the conventional bipolar electrode(s) (i.e., the electrode(s) in which the amount of the active material in the electrode layer is substantially uniform) may be used.

As in the first and second embodiments, the thickness of the electrode layer varies so that the amount of the active material varies (refer to FIG. 1), or the density of the active material per unit volume of the electrode layer varies so that the amount of the active material varies (refer to FIG. 7). The raw material of the active material may vary, or the mixing ratio between the plural raw materials that constitute the active material may vary.

In each of the first and second embodiments, the amount of the active material varies to suppress the variation in the temperature in the bipolar electrode. However, the amount of the conductive agent contained in the electrode layer may vary to suppress the variation in the temperature in the bipolar electrode.

The configuration in which the density of the conductive agent in the electrode layer (the amount of the conductive agent per unit volume of the electrode layer) varies will be more specifically described with reference to FIG. 11. FIG. 11 shows a front view of the bipolar electrode used in the bipolar battery, and diagrams showing the distribution of the current density and the distribution of the density of the conductive agent according to the position in the bipolar electrode.

In the configuration shown in FIG. 11, the density of the conductive agent is lowest in the region of the electrode layer, which is positioned in the center portion of the bipolar electrode 3. The density of the conductive agent is highest in the region of the electrode layer, which is positioned in each outer portion of the bipolar electrode 3. The density of the conductive agent increases from the center portion of the bipolar electrode 3 toward each outer portion of the bipolar electrode 3.

The conductive agent is used to improve electron conductivity. Therefore, by decreasing the density of the conductive agent, the resistance (i.e., so-called electron resistance) in the electrode layer is increased. By increasing the density of the conductive agent, the resistance in the electrode layer is decreased. By increasing the resistance, the current density is decreased.

As described above, the heat generation caused by charging/discharging of the battery is suppressed in the region where the current density is low. Therefore, when the density of the conductive agent is low in the region of the electrode layer, which is positioned in the center portion of the bipolar electrode 3 where the heat radiation performance is low, the increase in the temperature due to charging/discharging is suppressed. Thus, the variation in the temperature in the bipolar electrode 3 is suppressed.

In the configuration shown in FIG. 11, the density of the conductive agent in the electrode layer continuously varies. However, the invention is not limited to this configuration. The density of the conductive agent may vary in a stepwise manner. In this case as well, the density of the conductive agent in the region of the electrode layer, which is positioned in the center portion of the bipolar electrode, may be made lower than the density of the conductive agent in the region of the electrode layer, which is positioned in each outer portion of the bipolar electrode. In FIG. 11, the density of the conductive agent varies in the X direction and Y direction. However, the density of the conductive agent may vary in one of the X direction and Y direction. In this case, the variation in the temperature is suppressed in the direction in which the density of the conductive agent varies.

The configuration shown in FIG. 11 is made taking into account the heat radiation performance of the battery. However, when the temperature varies in the bipolar electrode due to the thermal influence on the battery from the outside (for example, the heat source), the density of the conductive agent in the electrode layer may be set to vary, taking the thermal influence into account, as in the described cases. For example, when the temperature is highest in the region of the bipolar electrode 3, which is close to the heat source, the density of the conductive agent in this region of the bipolar electrode 3 may be smaller than the density of the conductive agent in the other region of the bipolar electrode 3.

In the bipolar battery with the stacking structure, the density of the conductive agent in the electrode layer in the bipolar electrode may vary according to the position of the bipolar electrode in the stacking direction.

The configuration in which the density of the conductive agent in the bipolar electrode varies according to the position of the bipolar electrode in the stacking direction will be more specifically described with reference to FIGS. 12A to 12E. FIGS. 12A to 12E show the temperature distribution, the distribution of the voltage, the distribution of the input/output value, and the distribution of the density of the conductive agent in the electrode layer, in the stacking direction of the bipolar battery with the stacking structure.

Figures 12A, 12B, 12C, 12D, 12E:
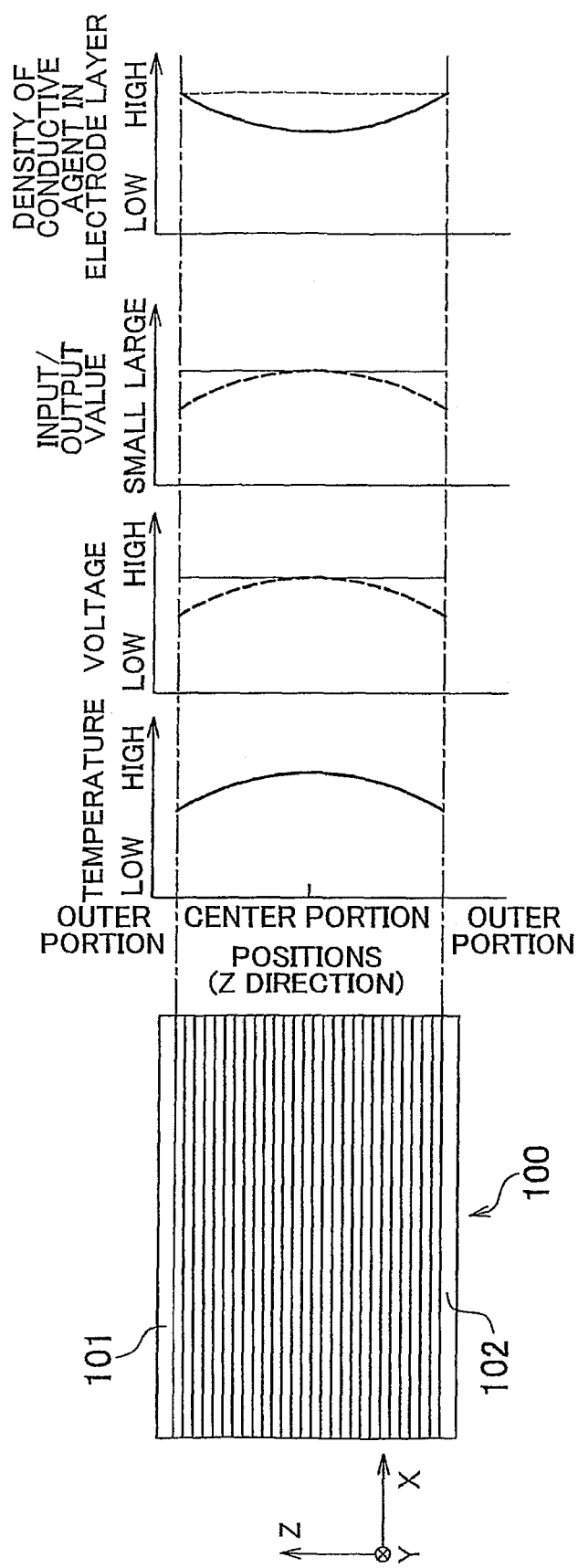
FIGS. 12A to 12E show relations between the positions in the stacking direction of the bipolar battery, and the temperature, the voltage value, the input/output value, and the density of the conductive agent in the electrode layer.

In FIG. 12A, the positive terminal 101 and the negative terminal 102, which are used for charging/discharging, are provided in the ends of the bipolar battery 100 in the stacking direction. The positive terminal 101 and the negative terminal 102 are connected to the circuit (not shown) that controls the charging/discharging of the bipolar battery 100.

As shown in FIG. 12B, in the bipolar battery 100 in which the plural unit cells are stacked, the temperature is not uniform in the stacking direction. The temperature may be highest in the center portion of the bipolar battery 100, and may be lowest in each outer portion of the bipolar battery 100.

In this case, if the density of the conductive agent in the electrode layer is substantially uniform in all the bipolar electrodes 3 in the stacking direction as in the conventional technology (refer to the dotted line in FIG. 12E), the resistance value is small in the unit cell positioned in the center portion of the bipolar battery 100 due to the increase in the temperature caused by, for example, charging/discharging.

As a result, as shown in the dotted lines in FIGS. 12C and 12D, the voltage value and the input/output value vary among the unit cells in the stacking direction.

If the density of the conductive agent in the electrode layer is substantially uniform in all the bipolar electrodes 3 in the stacking direction, the resistance value is substantially uniform in all the unit cells before the temperature varies in the stacking direction (in other words, before the bipolar battery 100 is used). However, because the temperature varies in the stacking direction due to the use of the bipolar battery 100 (for example, due to the charging/discharging), the resistance value in the unit cell varies according to the position of the unit cell in the stacking direction.

As described above, in the configuration shown in FIG. 12A, the density of the conductive agent in the electrode layer in the unit cell (bipolar electrode) varies according to the position of the unit cell (bipolar electrode) in the stacking direction.

More specifically, the density of the conductive agent in the electrode layer in the bipolar electrode positioned in the center portion of the bipolar battery is lowest, and the density of the conductive agent in the electrode layer in the bipolar electrode positioned in each outer portion of the bipolar battery is highest. The density of the conductive agent in the electrode layer in the bipolar electrode increases from the center portion of the bipolar battery toward each outer portion of the bipolar battery.

The density of the conductive agent in the electrode layer is substantially uniform in each bipolar electrode (when manufacturing tolerance is taken into account). In addition to the configuration shown in FIG. 12A, the electrode layer in each bipolar electrode may have configuration shown in FIG. 11.

As described above, by decreasing the density of the conductive agent in the electrode layer in the unit cell, the resistance value in the unit cell is increased. By increasing the density of the conductive agent in the electrode layer in the unit cell, the resistance value in the unit cell is decreased.

Thus, when the resistance value in the unit cell is set in advance to vary according to the position of the unit cell in the stacking direction as in the configuration shown in FIG. 12A, it is possible to suppress the variation in the resistance value in the unit cell according to the position of the unit cell in the stacking direction, even if the temperature distribution shown in FIG. 12B occurs due to, for example, charging/discharging of the bipolar battery 100. By suppressing the variation in the resistance value, the variation in the voltage value and the variation in the input/output value in the bipolar battery 100 are suppressed. For example, as shown by the solid line FIGS. 12C and 12D, the voltage value and the input/output value are made substantially uniform.

The density distribution shown in FIG. 12E may be set based on the temperature distribution in the stacking direction (FIG. 12B). That is, by determining in advance the temperature distribution in the stacking direction caused by, for example, charging/discharging of the bipolar battery 100, it is possible to determine the amount of change in the voltage in each unit cell due to the change in the temperature.

The resistance value (the density of the conductive agent in the electrode layer) in each unit cell may be set based on the amount of change in the voltage in each unit cell. That is, the resistance value (the density of the conductive agent in the electrode layer) in each unit cell may be set to suppress the variation in the voltage value in the stacking direction after the voltage in each unit cell changes.

With the configuration shown in FIG. 12A, it is possible to suppress the variation in the voltage value and the variation in the input/output value among the unit cells in the stacking direction. Therefore, it is possible to execute the charging/discharging control for all the unit cells in the bipolar battery 100, using the same criteria.

It is known that if, in the secondary battery, the input/output voltage is out of the range from the upper limit voltage to the lower limit voltage, the input/output voltage generally has an adverse effect on battery life. Therefore, to increase the battery life, charging/discharging is performed so that the input/output voltage is in the range from the upper limit voltage to the lower limit voltage (the fail safe). In the embodiment, the charging/discharging control is executed for all the unit cells under the same condition.

Further, because resistance values in all the unit cells in the stacking direction are set with respect to the resistance value in the unit cell positioned in the center portion of the bipolar battery, the input/output value is equivalent to the largest input/output value in the conventional bipolar battery (shown by the dotted line), as shown in FIG. 12D.

The configuration shown in FIG. 12A is made taking into account the heat radiation performance of the bipolar battery with the stacking structure. However, when the temperature varies in the stacking direction of the bipolar battery due to the thermal influence on the bipolar battery from the outside (for example, the heat source), the density of the conductive agent in the electrode layer in the bipolar electrode may be set to vary according to the position of the bipolar electrode in the stacking direction, taking the thermal influence into account, as in the described cases. For example, when the temperature is highest in the unit cell close to the heat source, the density of the conductive agent in the electrode layer in this unit cell may be smaller than the density of the conductive agent in the electrode layer in any other unit cell.

When the amount of the active material is substantially uniform in the entire electrode layer, and only the amount of the conductive agent in the electrode layer varies, part of the active material may not be used for charging/discharging of the battery. That is, in a region where the amount of the conductive agent is smaller than the amount of the conductive agent in the other region, there may be a large amount of the active material that is not used for charging/discharging of the battery.

Ordinarily, the raw material used as the active material is relatively expensive. Therefore, it is not undesirable that part of the active material should not be used. Accordingly, it is preferable that the amount of the active material should also vary when the amount of the conductive agent varies. Thus, the active material is efficiently used. This avoids a situation where the cost of the bipolar electrode increases because part of the active material contained in the bipolar electrode is not used.

In each of the first and second embodiments, the amount of the active material varies to suppress the variation in the temperature in the bipolar electrode. However, the configuration of the solid electrolyte contained in the electrode layer in the bipolar electrode may vary to suppress the variation in the temperature in the bipolar electrode. More specifically, the density of the solid electrolyte in the electrode layer may vary. When the electrode layer contains plural solid electrolytes made of raw materials different from each other, the mixing ratio between the plural solid electrolytes may vary.

The configuration in which the density of the solid electrolyte in the electrode layer (i.e., the amount of the solid electrolyte per unit volume) varies will be more specifically described with reference to FIG. 13. FIG. 13 shows a front view of the bipolar electrode used in the bipolar battery, and diagrams showing the distribution of the current density and the distribution of the density of the solid electrolyte in the electrode layer, according to the position in the bipolar electrode.

In the configuration shown in FIG. 13, the density of the solid electrolyte is lowest in the region of the electrode layer, which is positioned in the center portion of the bipolar electrode 3. Also, the density of the solid electrolyte is highest in the region of the electrode layer, which is positioned in each outer portion of the bipolar electrode 3. The density of the solid electrolyte increases from the center portion of the bipolar electrode 3 toward each outer portion of the bipolar electrode 3.

By decreasing the density of the solid electrolyte in the electrode layer, the ion conductivity in the electrode layer is decreased. By increasing the density of the solid electrolyte in the electrode layer, the ion conductivity in the electrode layer is increased. By decreasing the ion conductivity, the current density is decreased.

As described above, the heat generation caused by charging/discharging of the battery is suppressed in the region where the current density is low. Therefore, by decreasing the density of the solid electrolyte in the region of the electrode layer, which is positioned in the center portion of the bipolar electrode 3 where the heat radiation performance is low, the increase in the temperature due to charging/discharging is suppressed. Thus, the variation in the temperature in the bipolar electrode 3 is suppressed.

In the configuration shown in FIG. 13, the density of the solid electrolyte in the electrode layer continuously varies. However, the invention is not limited to this configuration. The density of the solid electrolyte may vary in the stepwise manner. In this case as well, the density of the solid electrolyte in the region of the electrode layer, which is positioned in the center portion of the bipolar electrode, is lower than the density of the solid electrolyte in the region of the electrode layer, which is positioned in each outer portion of the bipolar electrode. In the configuration shown in FIG. 13, the density of the solid electrolyte in the electrode layer varies in the X direction and Y direction. However, the density of the solid electrolyte in the electrode layer may vary in one direction. In this case, the variation in the temperature is suppressed in the direction where the density of the solid electrolyte varies.

The configuration shown in FIG. 13 is made taking into account the heat radiation performance of the battery. However, when the temperature varies in the bipolar electrode due to the thermal influence on the battery from the outside (for example, the heat source), the density of the solid electrolyte in the electrode layer may be set to vary, taking the thermal influence into account, as in the described cases. For example, when the temperature is highest in the region of the bipolar electrode 3, which is close to the heat source, the density of the solid electrolyte in this region of the bipolar electrode 3 may be smaller than the density of solid electrolyte in the other region of the bipolar electrode 3.

When plural different types of solid electrolytes (plural solid electrolytes made of raw materials different from each other) are contained in the electrode layer in the bipolar electrode 3, the plural different types of solid electrolytes may be selectively used, or the mixing ratio between the plural solid electrolytes may be changed, according to the position in the bipolar electrode. Thus, the ion conductivity varies. In this case, the plural solid electrolytes may be selectively used, or the mixing ratio between the plural solid electrolytes may be changed so that the ion conductivity is lowest in the center portion of the bipolar electrode 3, and highest in each outer portion of the bipolar electrode 3.

Examples of the raw material of the solid electrolyte and the ion conductivity include $Li_2O$—$B_2O_3$; $10^{-7}$ [S/cm], $Li_2O_2$—$SiO_2$; $10^{-6}$ [S/cm], $Li_2S$—$GeS_4$; $10^{-5}$ [S/cm], $Li_2S$—$P_2S_5$; $10^{-4}$ [S/cm], and $LiI$—$Li_2S$—$P_2S_5$; $10^{-3}$ [S/cm]. By selectively using the raw materials, or changing the mixing ratio between the raw materials, according to the position in the bipolar electrode, the ion conductivity in the bipolar electrode varies as required.

When a coating is provided on the surface of each solid electrolyte particle, the ion conductivity is increased/decreased by changing the raw material of the coating. When the different types of solid electrolyte particles (i.e., the solid electrolyte particles on which coatings made of raw materials different from each other are provided) are used, the different types of solid electrolyte particles may be selectively used, or the mixing ratio between the different types (at least two types) of solid electrolyte particles may vary, according to the position in the bipolar electrode 3.

In the bipolar battery with the stacking structure, the configuration of the solid electrolyte in the electrode layer in the bipolar electrode may vary according to the position of the bipolar electrode in the stacking direction. More specifically, the density of the solid electrolyte in the electrode layer may vary. Alternatively, when the electrode layer contains plural solid electrolytes made of raw materials different from each other, the mixing ratio between the plural solid electrolytes may vary.

The configuration in which the density of the solid electrolyte in the electrode layer in the bipolar electrode 3 varies according to the position of the bipolar electrode 3 in the stacking direction will be described with reference to FIGS. 14A to 14E. FIGS. 14A to 14E show the temperature distribution, the distribution of the voltage, the distribution of the input/output value, and the distribution of the density of the solid electrolyte in the electrode layer in the bipolar electrode, in the stacking direction of the bipolar battery with the stacking structure.

In FIG. 14A, the positive terminal 101 and the negative terminal 102, which are used for charging/discharging, are provided in the ends of the bipolar battery 100 in the stacking direction. The positive terminal 101 and the negative terminal 102 are connected to the circuit (not shown) that controls the charging/discharging of the bipolar battery 100.

As shown in FIG. 14B, in the bipolar battery 100 in which the plural unit cells are stacked, the temperature is not uniform in the stacking direction. The temperature may be highest in the center portion of the bipolar battery 100, and may be lowest in each outer portion of the bipolar battery 100.

In this case, if the density of the solid electrolyte in the electrode layer is substantially uniform in all the bipolar electrodes 3 in the stacking direction as in the conventional technology (refer to the dotted line in FIG. 14E), the resistance value is small in the unit cell positioned in the center portion of the bipolar battery 100 due to the increase in the temperature. As a result, as shown by the dotted lines in FIGS. 14C and 14D, the voltage value and the input/output value vary among the unit cells in the stacking direction.

If the density of the solid electrolyte in the electrode layer is substantially uniform in all the bipolar electrodes in the stacking direction, the resistance value is substantially uniform in all the unit cells before the temperature varies in the stacking direction (in other words, before the bipolar battery 100 is used). However, because the temperature varies in the stacking direction due to the use of the bipolar battery 100 (for example, due to the charging/discharging), the resistance value in the unit cell varies according to the position of the unit cell in the stacking direction.

As described above, in the embodiment, the density of the solid electrolyte in the electrode layer in the unit cell (bipolar electrode) varies according to the position of the unit cell (bipolar electrode) in the stacking direction.

More specifically, the density of the solid electrolyte in the electrode layer in the bipolar electrode positioned in the center portion of the bipolar battery is lowest, and the density of the solid electrolyte in the electrode layer in the bipolar electrode positioned in each outer portion of the bipolar battery is highest. The density of the solid electrolyte in the electrode layer in the bipolar electrode increases from the center portion of the bipolar battery toward each outer portion of the bipolar battery.

The density of the solid electrolyte in the electrode layer is substantially uniform in each bipolar electrode (when manufacturing tolerance is taken into account). In addition to the configuration shown in FIG. 14A, the electrode layer in each bipolar electrode may have the configuration shown in FIG. 13.

As described above, by decreasing the density of the solid electrolyte in the electrode layer, the ion conductivity in the electrode layer is decreased. By increasing the density of the solid electrolyte in the electrode layer, the ion conductivity in the electrode layer is increased.

Thus, when the ion conductivity in the electrode layer in the bipolar electrode is set in advance to vary according to the position of the bipolar electrode in the stacking direction, the variation in the resistance value among the unit cells in the stacking direction is suppressed, even if the temperature distribution shown in FIG. 14B occurs due to, for example, charging/discharging of the bipolar battery 100. By suppressing the variation in the resistance value, the variation in the voltage value and the variation in the input/output value in the bipolar battery 100 are suppressed. For example, as shown by the solid lines FIGS. 14C and 14D, the voltage value and the input/output value are made substantially uniform.

The density distribution shown in FIG. 14E may be set based on the temperature distribution in the stacking direction (FIG. 14B). That is, by determining in advance the temperature distribution in the stacking direction caused by, for example, charging/discharging of the bipolar battery 100, it is possible to determine the amount of change in the voltage in each unit cell due to the change in the temperature.

The resistance value in each unit cell (the ion conductivity in the electrode layer in each bipolar electrode) may be set based on the amount of change in the voltage in each unit cell. That is, the resistance value in each unit cell (the ion conductivity in the electrode layer in each bipolar electrode) may be set to suppress the variation in the voltage value in the stacking direction after the voltage in each unit cell changes.

With the configuration shown in FIG. 14A, it is possible to suppress the variation in the voltage value and the variation in the input/output value among the unit cells in the stacking direction. Therefore, it is possible to execute the charging/discharging control for all the unit cells in the bipolar battery 100, using the same criteria.

It is known that if, in the secondary battery, the input/output voltage is out of the range from the upper limit voltage to the lower limit voltage, the input/output voltage generally has an adverse effect on battery life. Therefore, to increase the battery life, charging/discharging is performed so that the input/output voltage is in the range from the upper limit voltage to the lower limit voltage (the fail safe). In the embodiment, the charging/discharging control is executed for all the unit cells under the same condition.

Further, because resistance values in all the unit cells in the stacking direction are set with respect to the resistance value in the unit cell positioned in the center portion of the bipolar battery, the input/output value is equivalent to the largest input/output value in the conventional bipolar battery (shown by the dotted line), as shown in FIG. 14D.

The configuration shown in FIG. 14A is made taking into account the heat radiation performance of the bipolar battery with the stacking structure. However, when the temperature varies in the stacking direction of the bipolar battery due to the thermal influence on the bipolar battery from the outside (for example, the heat source), the density of the solid electrolyte (or the mixing ratio between the plural types of solid electrolytes) in the electrode layer in the bipolar electrode may be set to vary according to the position of the bipolar electrode in the stacking direction, taking the thermal influence into account, as in the described cases. For example, the density of the solid electrolyte in the electrode layer in the bipolar electrode close to the heat source may be lower than the density of the solid electrolyte in the electrode layer in the bipolar electrode in the other position in the stacking direction.

When plural different types of solid electrolytes (plural solid electrolytes made of raw materials different from each other) are contained in the electrode layer in the bipolar electrode, the plural different types of solid electrolytes may be selectively used, or the mixing ratio between the plural solid electrolytes contained in the electrode layer in the bipolar electrode may be changed, according to the position of the bipolar electrode in the stacking direction. Thus, the ion conductivity varies in the stacking direction. In this case, all the regions of the electrode layer in each bipolar electrode may have the same configuration (i.e., the raw material of the solid electrolyte, or the mixing ratio between the plural solid electrolytes may be uniform in all the regions of the electrode layer in each bipolar electrode). Alternatively, the configuration of the electrode layer (i.e., the raw material of the solid electrolyte, or the mixing ratio between the plural solid electrolytes) may vary according to the position in the bipolar electrode, as in the configuration in FIG. 13.

When the plural types of solid electrolytes are used, the solid electrolytes made of raw materials different from each other may be selectively used, or the mixing ratio between the plural solid electrolytes contained in the electrode layer in the bipolar electrode may be changed so that the ion conductivity in the electrode layer is lowest in the bipolar electrode positioned in the center portion of the bipolar battery, and the ion conductivity in the electrode layer is highest in the bipolar electrode positioned in each outer portion of the bipolar battery.

When a coating is provided on the surface of each solid electrolyte particle, the ion conductivity is increased or decreased by changing the raw material of the coating. When the different types of solid electrolyte particles (i.e., the solid electrolyte particles on which coatings made of raw materials different from each other are provided) are used, the type of the solid electrolyte particles contained in the electrode layer in the bipolar electrode may vary, or the mixing ratio between the plural types (at least two types) of the solid electrolyte particles contained in the electrode layer in the bipolar electrode may vary according to position of the bipolar electrode in the stacking direction.

The invention claimed is:

1. An electric storage device which includes plural electrodes and plural ion-conductive layers that are stacked such that each of the plural ion-conductive layers is disposed between a pair of electrodes among the plural electrodes, wherein:

each of the plural electrodes includes a current collector, and an electrode layer, formed on the current collector, which contains an active material;

a first electrode among the plural electrodes is disposed in a position where heat radiation performance is lower than the heat radiation performance in a position where a second electrode among the plural electrodes is disposed, in a stacking direction in which the plural electrodes are stacked in the electric storage device;

a configuration of the electrode layer in the first electrode differs from a configuration of the electrode layer in the second electrode such that a resistance value in the first electrode is larger than the resistance value in the second electrode;

the first electrode is positioned in a center portion of the electric storage device in the stacking direction; and the second electrode is closer to an end of the electric storage device in the stacking direction than the first electrode.

2. The electric storage device according to claim 1, wherein a particle diameter of the active material in the electrode layer in the first electrode is larger than the particle diameter of the active material in the electrode layer in the second electrode.

3. The electric storage device according to claim 1, wherein the electrode layer in each of the plural electrodes contains a conductive agent, and a density of the conductive agent in the electrode layer in the first electrode is lower than the density of the conductive agent in the electrode layer in the second electrode.

4. The electric storage device according to claim 1, wherein the electrode layer in each of the plural electrodes contains a solid electrolyte, and a density of the solid electrolyte in the electrode layer in the first electrode is lower than the density of the solid electrolyte in the electrode layer in the second electrode.

5. The electric storage device according to claim 1, wherein the electrode layer in each of the plural electrodes contains a solid electrolyte, and a raw material of the solid electrolyte in the electrode layer in the first electrode differs from the raw material of the solid electrolyte in the electrode layer in the second electrode.

6. The electric storage device according to claim 1, wherein the electrode layer in each of the plural electrodes contains plural solid electrolytes made of raw materials different from each other, and a mixing ratio between the plural solid electrolytes in the electrode layer in the first electrode differs from the mixing ratio between the plural solid electrolytes in the electrode layer in the second electrode.

7. The electric storage device according to claim 4, wherein an ion conductivity in the electrode layer in the first electrode is lower than the ion conductivity in the electrode layer in the second electrode.

8. The electric storage device according to claim 1, wherein a thickness of the electrode layer in the first electrode is smaller than the thickness of the electrode layer in the second electrode.

9. The electric storage device according to claim 1, wherein the position where the first electrode is disposed includes a position where the heat radiation performance is decreased by a heat source disposed outside of the electric storage device.

10. The electric storage device according to claim 5, wherein an ion conductivity in the electrode layer in the first electrode is lower than the ion conductivity in the electrode layer in the second electrode.

11. The storage device according to claim 6, wherein an ion conductivity in the electrode layer in the first electrode is lower than the ion conductivity in the electrode in the second electrode.

\* \* \* \* \*